United States Patent
Kuebler et al.

(10) Patent No.: US 7,190,893 B2
(45) Date of Patent: Mar. 13, 2007

(54) FLUID HEATER WITH LOW POROSITY THERMAL MASS

(75) Inventors: Karl-Heinz Kuebler, Grand Blanc, MI (US); Daryl G. Harris, Oxford, MI (US); Lee A. Bissonnette, Clarkston, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 16 days.

(21) Appl. No.: 10/608,508

(22) Filed: Jun. 27, 2003

(65) Prior Publication Data

US 2004/0264951 A1      Dec. 30, 2004

(51) Int. Cl.
*H05B 3/78* (2006.01)

(52) U.S. Cl. .................. 392/485; 392/494

(58) Field of Classification Search ........ 392/465–484, 392/494
See application file for complete search history.

(56) References Cited

U.S. PATENT DOCUMENTS

| | | | |
|---|---|---|---|
| 653,629 A | 7/1900 | Schneider | |
| 941,215 A | 11/1909 | Wade | |
| 1,523,156 A | 6/1925 | Adams | |
| 1,636,190 A | 2/1927 | Mattoney | |
| 2,833,909 A | 5/1958 | Levey | 219/39 |
| 3,014,251 A | 12/1961 | Sstern | 20/40.5 |
| 3,202,447 A | 8/1965 | Whaley | 294/87.2 |
| 3,292,866 A | 12/1966 | Benner | 239/284 |
| 3,332,046 A | 7/1967 | Rodaway | 335/81 |
| 3,338,476 A | 8/1967 | Marcoux | 222/146 |
| 3,427,675 A | 2/1969 | Tibbet | |
| 3,489,884 A | 1/1970 | Wasekeski | 219/522 |
| 3,553,428 A | 1/1971 | McGhee | 219/494 |
| 3,632,042 A | 1/1972 | Goulish | 239/130 |
| 3,668,757 A | 6/1972 | Rieden | 29/157.3 |
| 3,716,886 A | 2/1973 | Klomp | 15/250.04 |
| 3,756,510 A | 9/1973 | Nitterl | 239/129 |
| 3,785,359 A | 1/1974 | Whittaker | 126/19.5 |
| 3,888,412 A | 6/1975 | Lundo | 237/12.3 B |
| 3,891,827 A | 6/1975 | Wyse | 219/302 |
| 3,977,436 A | 8/1976 | Larmor | 137/625.65 |
| 3,979,068 A | 9/1976 | Applebaum | 239/284 R |
| 4,090,668 A | 5/1978 | Kochensur | 239/130 |
| 4,106,508 A | 8/1978 | Berlin | 128/346 |
| 4,159,026 A | 6/1979 | Williamson | 137/625.5 |
| 4,177,375 A | 12/1979 | Meixner | 219/441 |
| 4,199,675 A | 4/1980 | Sharpless | |
| 4,212,425 A | 7/1980 | Schlick | 239/133 |

(Continued)

FOREIGN PATENT DOCUMENTS

CA       1216713       1/1987

(Continued)

*Primary Examiner*—Thor S. Campbell
(74) *Attorney, Agent, or Firm*—Young & Basile, P.C.

(57) ABSTRACT

A fluid heater apparatus and method of making same includes a low porosity material, thermally conductive mass. A heat source is disposed in the thermally conductive mass for imparting heat to the mass. Fluid in a flow path through the mass absorbs heat from the mass. The thermally conductive mass is molded, cast or extruded from a material which, with the selected forming process, provides a low porosity mass. The mass may be formed of ceramic, aluminum and poltruded carbon. The mass can be cast from a material which is introduced into the casting mold in a semi-solid temperature state.

46 Claims, 18 Drawing Sheets

U.S. PATENT DOCUMENTS

| | | | |
|---|---|---|---|
| 4,248,383 A | 2/1981 | Savage | 239/284 |
| 4,253,493 A | 3/1981 | English | 137/625.18 |
| 4,295,111 A | 10/1981 | Frosch | 335/256 |
| 4,295,769 A | 10/1981 | Douthett | 411/411 |
| 4,306,589 A | 12/1981 | Harned | 137/625.65 |
| 4,343,988 A * | 8/1982 | Roller et al. | 392/467 |
| 4,358,652 A | 11/1982 | Kaarup | 219/10.55 |
| 4,403,756 A | 9/1983 | Berlin | 244/223 |
| 4,417,116 A | 11/1983 | Black | |
| 4,430,994 A | 2/1984 | Clawson | 128/203.27 |
| 4,489,863 A | 12/1984 | Horchos | 222/504 |
| 4,508,957 A * | 4/1985 | Rocchitelli | 392/479 |
| 4,524,797 A | 6/1985 | Lungu | 137/343 |
| 4,534,539 A | 8/1985 | Dettmann | 251/65 |
| 4,561,632 A | 12/1985 | Hugler | 251/129.15 |
| 4,574,841 A | 3/1986 | Hugler | 137/625.44 |
| 4,589,374 A | 5/1986 | Farina | 122/14 |
| 4,669,430 A | 6/1987 | Reinold | 123/179 |
| 4,687,907 A * | 8/1987 | Barkley et al. | 392/473 |
| 4,689,548 A | 8/1987 | Mechlenburg | 323/243 |
| 4,690,371 A | 9/1987 | Bosley | 251/65 |
| 4,832,262 A | 5/1989 | Robertson | 239/129 |
| 4,858,576 A | 8/1989 | Jeffries | 123/145 |
| 4,877,186 A | 10/1989 | Scholl | 239/75 |
| 4,894,520 A | 1/1990 | Moran | 219/497 |
| 4,905,904 A | 3/1990 | Ohara | 239/284.1 |
| 4,927,060 A | 5/1990 | Snowball | 222/146.5 |
| 4,975,630 A | 12/1990 | Ma | 232/300 |
| 5,012,977 A | 5/1991 | Karklins et al. | 239/284.1 |
| 5,074,471 A | 12/1991 | Baumgarten et al. | 239/284.1 |
| 5,118,040 A | 6/1992 | Abe | 239/284.1 |
| 5,168,595 A | 12/1992 | Naylor, Jr. | 15/250.4 |
| 5,180,896 A | 1/1993 | Gibby | 219/10.55 |
| 5,183,099 A | 2/1993 | Bechu | 165/41 |
| 5,203,049 A | 4/1993 | Nogawa | 15/250.02 |
| 5,247,148 A | 9/1993 | Mencher | 219/10.55 |
| 5,249,623 A | 10/1993 | Miller | 165/156 |
| 5,254,083 A | 10/1993 | Gentelia | 604/35 |
| 5,280,806 A | 1/1994 | Glazebrook | 137/517 |
| 5,289,698 A | 3/1994 | Garimella | 62/498 |
| 5,318,071 A | 6/1994 | Gaiardo | 137/625.65 |
| 5,345,968 A | 9/1994 | Day | 137/625.46 |
| 5,351,934 A | 10/1994 | Jensen et al. | 251/65 |
| 5,354,965 A | 10/1994 | Lee | 219/202 |
| 5,369,247 A | 11/1994 | Doljack | 219/485 |
| 5,383,247 A | 1/1995 | Nickel | 15/250.04 |
| 5,428,206 A | 6/1995 | Uchida et al. | 219/505 |
| 5,433,382 A | 7/1995 | Baumgarten et al. | 239/284.1 |
| 5,509,606 A | 4/1996 | Breithaupt et al. | 239/130 |
| 5,598,502 A | 1/1997 | Takahashi et al. | 392/502 |
| 5,636,407 A | 6/1997 | Len | 15/250.19 |
| 5,673,360 A | 9/1997 | Scripps | 392/405 |
| 5,676,868 A | 10/1997 | Simmons | 219/202 |
| 5,724,478 A | 3/1998 | Thweatt | |
| 5,727,769 A | 3/1998 | Suzuki | 251/129.15 |
| 5,784,751 A | 7/1998 | Tippets | 15/250.04 |
| 5,881,428 A | 3/1999 | Simmons | 15/250.04 |
| 5,927,608 A | 7/1999 | Scorsiroli | 239/284.1 |
| 5,947,348 A | 9/1999 | Briski | 222/640 |
| 5,957,384 A | 9/1999 | Lansinger | 239/284.1 |
| 5,979,796 A | 11/1999 | Ponziani et al. | 239/284.1 |
| 5,988,529 A | 11/1999 | Suhring | 239/284.1 |
| 6,009,369 A | 12/1999 | Boisvert et al. | 701/99 |
| 6,029,908 A | 2/2000 | Petzold | 239/284.1 |
| 6,032,324 A | 3/2000 | Lansinger | 15/250.04 |
| 6,119,300 A | 9/2000 | Schmid | 15/250.04 |
| 6,133,546 A | 10/2000 | Bains | 219/202 |
| 6,148,258 A | 11/2000 | Boisvert | 701/99 |
| 6,164,564 A | 12/2000 | Franco | 239/284.1 |
| 6,199,587 B1 | 3/2001 | Shlomi | 137/625.5 |
| 6,236,019 B1 | 5/2001 | Piccione et al. | 219/303 |
| 6,247,653 B1 | 6/2001 | Seyfarth | 239/284.1 |
| 6,257,500 B1 | 7/2001 | Petzold | 239/284.1 |
| 6,260,608 B1 | 7/2001 | Kim | 165/41 |
| 6,271,506 B1 | 8/2001 | Glaser | 219/505 |
| 6,330,395 B1 * | 12/2001 | Wu | 392/494 |

FOREIGN PATENT DOCUMENTS

| | | |
|---|---|---|
| CA | 2133592 | 4/1995 |
| CA | 2176539 | 11/1997 |
| CH | 688432 | 9/1997 |
| DE | 854 403 | 11/1952 |
| DE | 1959978 | 11/1969 |
| DE | 2454920 | 5/1976 |
| DE | 2804804 | 8/1979 |
| DE | 23 53 738 | 9/1980 |
| DE | 3430 653 | 8/1984 |
| DE | 3 507 900 | 11/1986 |
| DE | 35 26 430 | 5/1987 |
| DE | 39 07 968 | 9/1990 |
| DE | 3430653 | 6/1993 |
| DE | 195 04 470 | 8/1996 |
| DE | 19820220 | 11/1999 |
| DE | 19829681 | 2/2000 |
| DE | 19935134 | 1/2001 |
| DE | 100 63 851 | 7/2002 |
| EP | 245641 | 4/1987 |
| EP | 342516 | 5/1998 |
| EP | 1 006 029 | 11/1999 |
| EP | 1 006 030 | 11/1999 |
| EP | 1 213 197 | 12/2000 |
| EP | 1162118 | 12/2001 |
| FR | 2 585 311 | 1/1987 |
| FR | 2 605 273 | 4/1988 |
| FR | 2 609 437 | 7/1988 |
| FR | 2 677 939 | 12/1992 |
| FR | 2 707 230 | 7/1993 |
| GB | 370687 | 5/1931 |
| GB | 1151214 | 5/1969 |
| GB | 1152170 | 5/1969 |
| GB | 1 318 498 | 5/1973 |
| GB | 1 451 666 | 10/1974 |
| GB | 2 044 601 | 10/1980 |
| GB | 2 121 681 | 1/1984 |
| GB | 2 225 096 | 5/1990 |
| GB | 2 260 399 | 4/1993 |
| GB | 2 271 276 | 4/1994 |
| GB | 2 271 712 | 4/1994 |
| GB | 2 290 461 | 1/1996 |
| GB | 2305233 | 4/1997 |
| GB | 2320086 | 5/1997 |
| GB | 2 308 971 | 7/1997 |
| GB | 2 310 795 | 9/1997 |
| GB | 2 331 231 | 5/1999 |
| GB | 2 350 555 | 12/2000 |
| GB | 2354688 | 3/2001 |
| JP | 63-93652 | 4/1988 |
| JP | 2053656 | 2/1990 |
| JP | 2234866 | 9/1990 |
| JP | 4-38248 | 2/1992 |
| JP | 8312824 | 11/1996 |
| US | 2002/0040895 | 4/2002 |
| US | 2002/0137455 | 9/2002 |
| WO | WO 9746431 | 12/1997 |
| WO | WO 98/49036 | 11/1998 |
| WO | WO 98/58826 | 12/1998 |
| WO | WO 99/56993 | 11/1999 |
| WO | WO 00/04754 | 2/2000 |
| WO | WO 00/27540 | 5/2000 |
| WO | WO 02/92237 | 11/2002 |

* cited by examiner

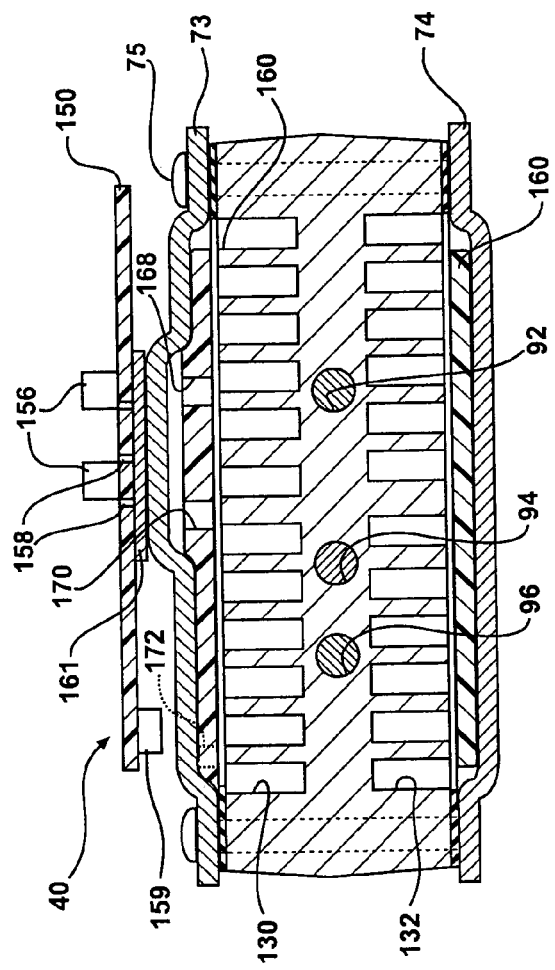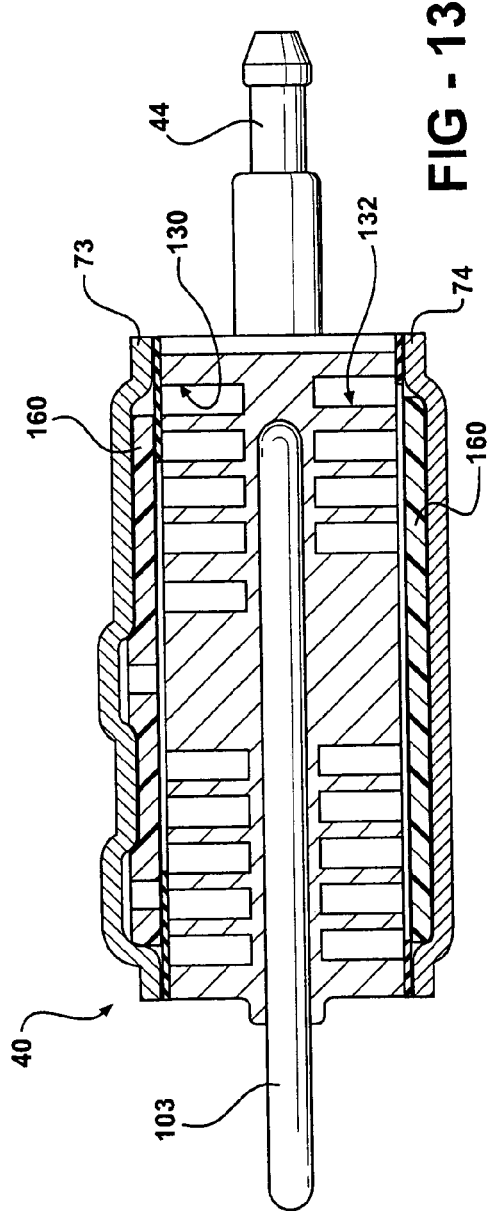

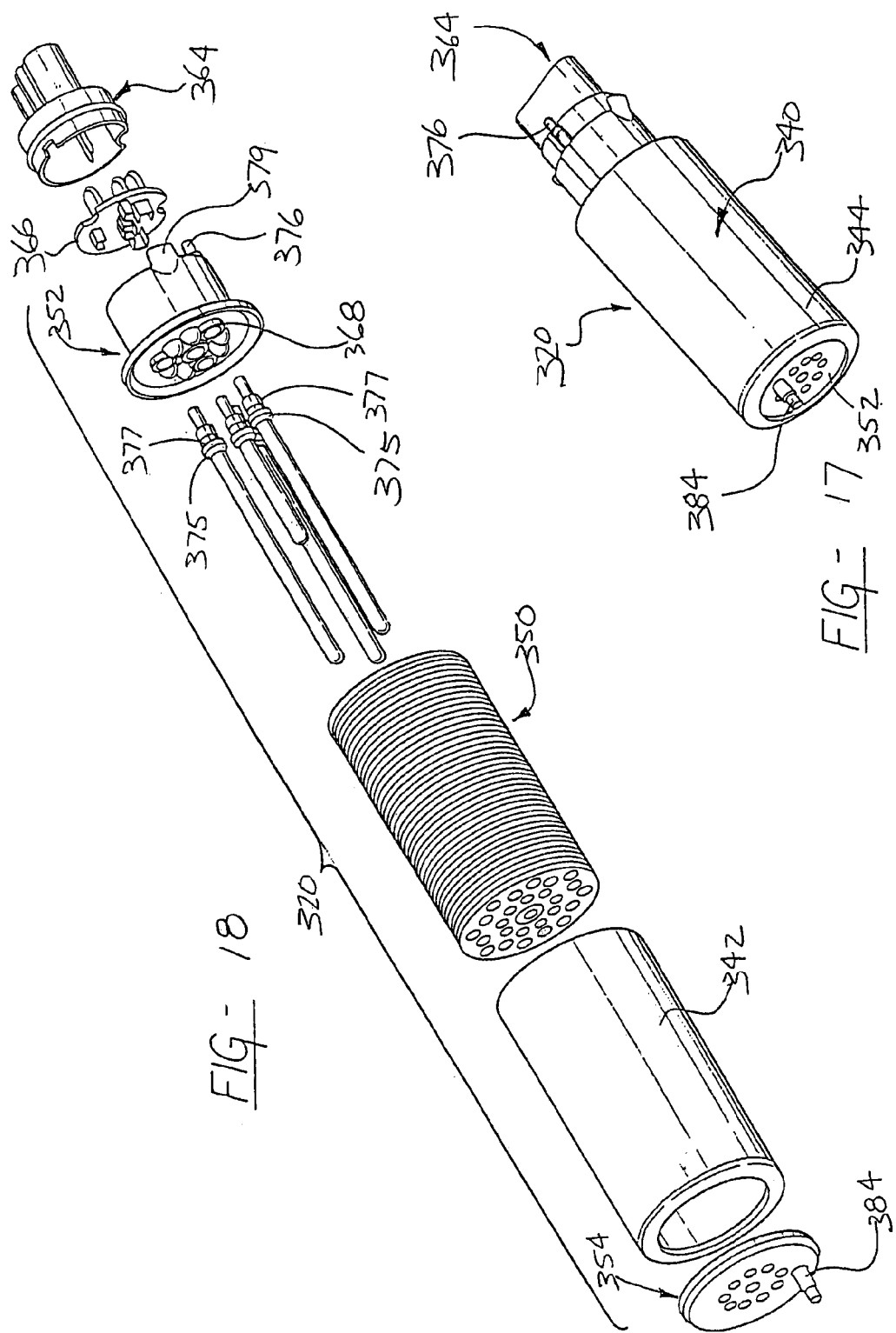

FLUID HEATER WITH LOW POROSITY THERMAL MASS

BACKGROUND

This invention relates, in general, to fluid heater apparatus and, more particularly, to fluid heater apparatus which provides a heated wash fluid to a cleanable surface, and, still more specifically, to a heated wash fluid apparatus for a vehicle windshield wash system.

It is necessary in many diverse applications to quickly elevate the temperature of a fluid to a higher use temperature. For example, it is desirable to be able to provide instant hot water, for use in homes, offices and campers, as well as for industrial processes.

In cleaning applications, it is known that hot fluid removes dirt and other debris from a surface much better and much faster than colder fluids. One heated fluid application is a vehicle wash fluid system, such as a windshield wash system as well as vehicle wash systems applied to camera lenses, exterior lamps and lamp lenses, mirrors, etc. Vehicles are typically provided with at least one and usually multiple windshield washers which are used to clear the field of vision in a windshield or rear backlight.

Typically, a nozzle or spray device is provided adjacent to or as part of the windshield wiper to disperse a pattern of wash fluid onto the windshield prior to and during the wiping operation to improve the efficiency of the wiping operation so as to provide a clear field of vision for the driver or vehicle passengers. The wash fluid is typically stored in a reservoir in the engine compartment and is pumped through the spray device upon manual activation of a control actuator by the vehicle driver.

Since it is known that warm or heated fluid provides better cleaning efficiency than cold fluid, it is known to provide a heated wash fluid to a vehicle window spray device. Various wash fluid heating devices have been developed, but all typically utilize a heat exchanger design wherein a heat source is disposed in a body through which the wash fluid flows. The wash fluid picks up heat in the heat exchange body which elevates its temperature prior to dispersion through the spray nozzle onto a vehicle window.

Thus, it would be desirable to provide a fluid heater apparatus providing a heated fluid which has a thermal mass with high thermal conductivity.

SUMMARY

The present invention is a fluid heater apparatus and method of making the same.

In one aspect, the heater apparatus includes a low porosity, thermally conductive mass, heating means thermally coupled to the thermally conductive mass for imparting heat to the thermally conductive mass, and a fluid flow path formed in the thermally conductive mass between an inlet and an outlet. Fluid in the fluid flow path absorbs heat from the thermally conductive mass, which heat is imparted to the mass by the heating means.

In another aspect, a wash apparatus includes a fluid reservoir contain a wash fluid, a pump coupled to the fluid reservoir for pumping fluid from the reservoir, a spray nozzle fluidically coupled to the pump for discharging fluid pumped from the reservoir onto a cleanable surface, and the heater apparatus disposed in fluid flow communication between the pump, the reservoir and the nozzle.

In one aspect, the thermally conductive mass is cast from a material in a semi-solid state. In another aspect, the thermally conductive mass is formed of molded ceramic. In yet another aspect, the thermally conductive mass is formed of an extruded material. The extruded thermally conductive mass can be formed of one of a ceramic material, aluminum and poltruded carbon.

The thermally conductive mass includes a plurality of throughbores extending through first and second ends. Means are provided for mounting the heater means in the thermally conductive mass concentrically within and surrounded by the plurality of throughbores. Means are also provided for coupling a fluid inlet to one end of each of a plurality of throughbores and a fluid outlet to each of the other ends of the plurality of throughbores to define the fluid flow path as at least one parallel flow path between the inlet and the outlet through the plurality of throughbores.

In another aspect, the present invention is a method for making a fluid heater. The method includes the steps of:

providing a thermally conductive mass formed of a low porosity material, the mass having at least one fluid flow channel extending therethrough, the fluid flow channel having first and second ends;

mounting heater means in the thermally conductive mass, the heater means supplying heat, when activated, to the thermally conductive mass; and fluidically coupling a fluid inlet to one end of the fluid flow channel and a fluid outlet to the other end of the fluid flow channel to define a fluid flow path between the inlet and the outlet wherein fluid in the fluid flow path absorbs heat from the thermally conductive mass.

The method of providing the thermally conductive mass further includes the step of forming the thermally conductive mass of one of aluminum, ceramic and poltruded carbon.

The method of providing the thermally conductive mass further includes the step of forming the thermally conductive mass by one of molding and casting.

The method of providing the thermally conductive mass further includes the step of forming the thermally conductive mass of a material cast at a semi-solid material temperature.

The method of providing the thermally conductive mass further includes the step of extruding the thermally conductive mass from a low porosity material.

The method of providing the thermally conductive mass further includes the step of extruding the thermally conductive mass as a one piece, monolithic body.

The method of providing the thermally conductive mass further includes the steps of forming the fluid flow channel as at least one throughbore extending between first and second ends in the body, and forming the at least one throughbore in a helical path between the first and second ends.

The method of providing the thermally conductive mass further includes the steps of forming the thermally conductive mass of a plurality of lamina, each lamina carrying an aperture defining a portion of the throughbore, and another aperture defining a portion of a bore for receiving a heater means.

The present invention provides a highly thermally conductive mass for use in a fluid heater apparatus for elevating the temperature of a fluid, particularly a wash fluid, by a unique combination of material and forming process. The mass can be formed of various materials which expand the material options for forming the thermally conductive mass to suit a particular application and/or fluid application temperature. The thermally conductive mass can also be formed of different manufacturing processes which contribute to a lower manufacturing cost, and lower porosity for higher thermal conductivity by minimizing air voids within the mass.

The use of the semi-solid material temperature to cast the thermally conductive mass provides a lower die temperature than the prior use of completely liquid, molten casting material. This lower die temperature protects the sealing member used to seal the fluid flow channel within one aspect of the thermally conductive mass.

BRIEF DESCRIPTION OF THE DRAWING

The various features, advantages and other uses of the present invention will become more apparent by referring to the following detail description and drawing in which:

FIG. 12 is a cross-sectional view generally taken along line 12—12 in FIG. 11;

FIG. 13 is a cross-sectional view generally taken along line 13—13 in FIG. 11;

FIG. 17 is a top perspective view of another aspect of the heater apparatus of the present invention;

FIG. 18 is an exploded, perspective view of the heater apparatus shown in FIG. 17

DETAILED DESCRIPTION

Figure 1:
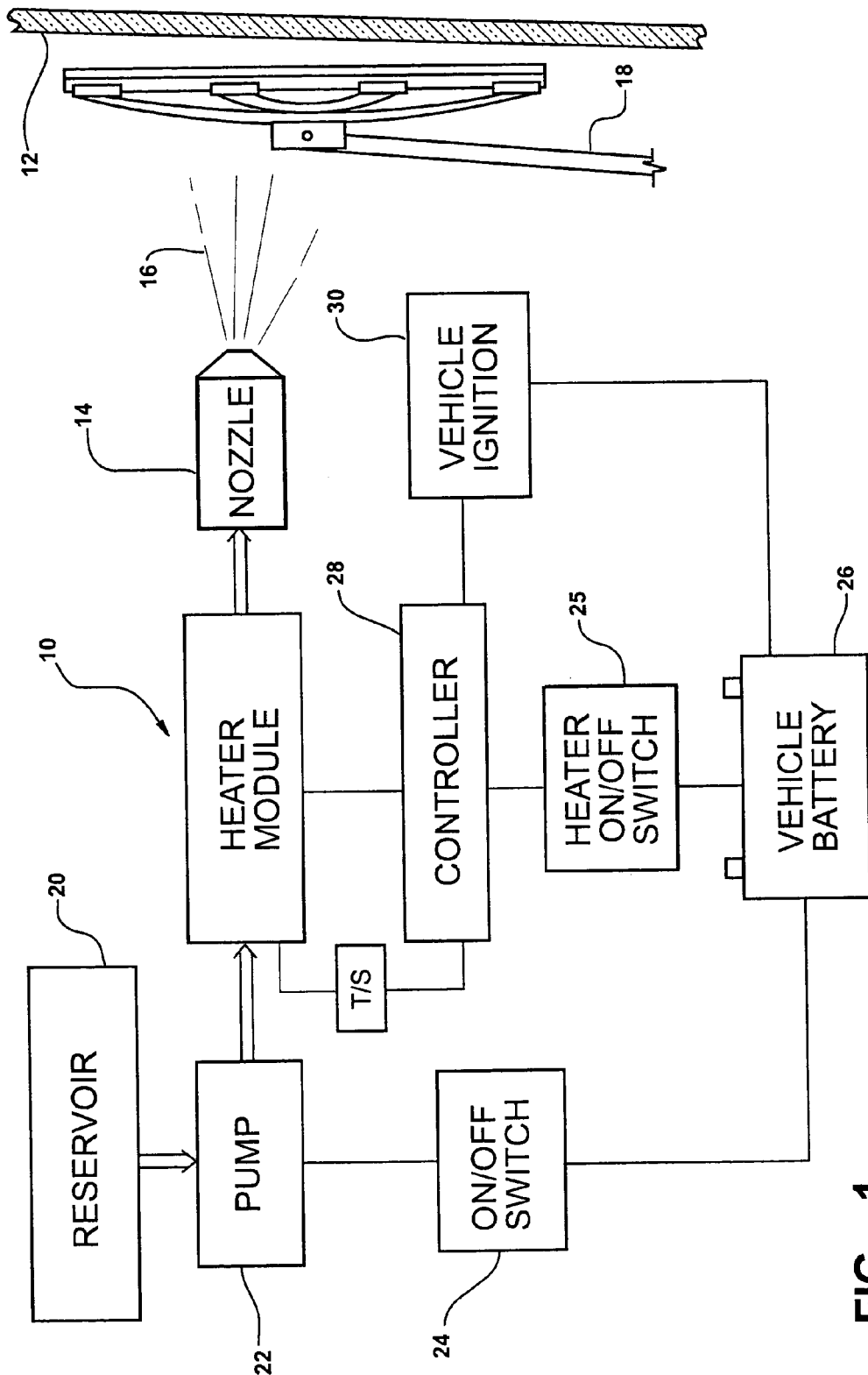
FIG. 1 is a block diagram of a fluid heater apparatus according to the present invention used in an exemplary vehicle window wash fluid delivery system.
Figure 2:
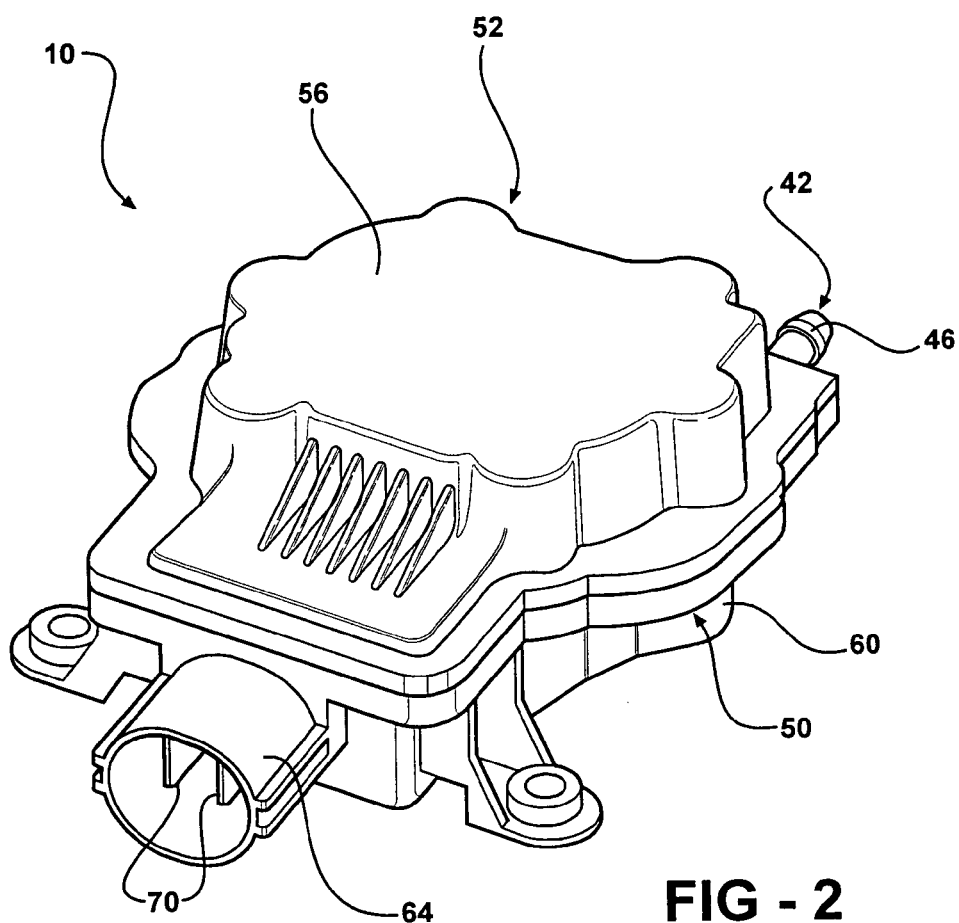
FIG. 2 is a perspective view of a heater module or the fluid heater apparatus according to one aspect of the present invention.

Referring now to FIG. 1, there is depicted an environment in which a heater apparatus or module 10 constructed in accordance with the teachings of the present invention can be advantageously utilized. Although the following use of the heater module 10 of the present invention is described in conjunction with a vehicle window wash system, it will be understood that the present heater module may be employed in other applications requiring heated fluid, such as any cleaning system used to clean any vehicle window, i.e., the windshield, rear backlight, or side windows, as well as cleaning systems for vehicle mirrors, camera, lenses, or sensor covers, etc.

As is conventional, a vehicle window 12, such as a windshield, rear backlight or window, etc., has one or more fluid delivery devices, such as spray nozzles 14 located in a position to dispense or spray a pattern 16 of wash fluid onto the exterior surface of the window 12. The dispersion of the wash fluid 16 is usually in conjunction with activation of a windshield wiper 18 over the window 12.

The wash fluid 16 is supplied from a fluid source, such as a reservoir or container 20. The fluid in the reservoir 20 is pumped to the nozzle(s) 14 by means of a pump 22 usually located in close proximity or attached to the reservoir 20.

As is conventional, an on/off switch 24, which may be mounted on a vehicle steering column stalk switch, is supplied with power from the vehicle battery 26 and enables the vehicle driver to control the on or off operation of the wash pump 22.

According to the invention, the wash fluid pumped from the reservoir 20 to the spray nozzles 14 is heated from ambient temperature to a predetermined higher temperature, such as about 65° C. to about 70° C., by example only, by the heater module 10. A suitable control circuit or controller 28 is provided for controlling the operation of the heater elements in the heater module 10. The controller 28 is also supplied with electric power from the vehicle battery 26. The controller 28 is activated by a "on" signal from the vehicle ignition 30 so as to heat the fluid contained within the flow paths in the heater module 10, as described hereafter, whenever the vehicle ignition is in an "on" state.

An optional on/off switch 25 may be connected between the battery 26 and the controller 28 to provide on and off operation for the entire heater system by disconnecting power to the controller 28. This enables the heater system to be activated or remain in an inactive state at the selection of the vehicle driver. As described hereafter, the on/off switch 25 may also be replaced by a separate input signal to the controller 28 from an external signal source, such as a vehicle body controller, to provide for selective deactivation of the heater module 10 under certain circumstances, such as a thermal event, low battery power, etc.

Referring now to FIGS. 2–14, there is depicted one aspect of the heater module 10 according to the present invention.

The heater module 110 includes a heat exchange mass or body 140 formed of a suitable high thermally conductive material. Although the mass 140 is described as being formed of die-cast, molded, or cast or machined aluminum, other materials, either homogeneous or nonhomogeneous, may also be employed. For example, the mass 40 can be formed of alumina particles, ceramic materials, etc.

The use of molding or casting techniques enables highly thermally conductive and moldable materials to be employed for the thermal mass 140. For example, the mass 40 may be formed of a high thermally conductive ceramic material, such as aluminum nitride, boron nitride, magnesium oxide, etc., by example only, which can be molded or cast into the shape of the thermal mass 140 described hereafter and shown in FIGS. 2–14. The use of ceramic material forms a compact, dense mass of low porosity which provides the desired high thermal conductivity between the heater elements mounted in the mass, the mass itself and the fluid flowing through the mass.

When a casting process is employed, the heat transfer rate and/thermal conductivity of the material forming the thermal mass 140 can be improved when a solid, low porosity material is utilized. Material processing methods, such as squeeze casting, thixocasting, rhiocasting, machining of a solid mill block, etc., can be advantageously employed since such processing methods remove or minimize the porosity or voids for the final formed mass. This enables the thermal conductivity of the thermal mass 140 to be significantly increase.

The thixocasting and rhiocasting processes as described in U.S. Pat. Nos. 6,311,759; 6,372,063; 6,200,396; 5,968,292; and 5,803,154, by way of example, the contents of which are incorporated herein by reference, generally utilize semi-solid materials where a precursor material of a suitable aluminum or other highly thermally conductive material which has been formed with a gobular a-AL phase and cooled into a slug, is placed in a heating device, heated into the semi-solid region between the solidus and liquidus temperatures and then injected or poured into a casting mold.

The end result of these processes is a dense mass with low porosity or void space. The lower porosity or void space contributes to a higher thermal conductivity since air normally trapped within such voids or interstices reduces the thermal conductivity of the entire mass due to its insulating properties.

For example, the heat transfer rate material effect for a standard casing of 380 aluminum has a thermal conductivity of approximately 96.2 W/m° C. compared to a pored rhiocast or thixocasting with a thermal conductivity of approximately 161W/m° C. using 356/357 aluminum.

When an application economically allows the use of a more expensive aluminum material, the resulting heat transfer rate material effect of a thixo or rhiocast material can reach approximately 228 W/m° C.

A thermal mass, similar to the thermal mass 140, with a different shape or cross-section can also be formed of various materials, such as aluminum, ceramics and poltruded carbon materials by extrusion. Although it may be difficult to extrude the thermal mass 140, extrusion of the above mentioned highly thermal conductive materials may be suitable for other thermal mass designs, such as that shown in FIGS. 17–29.

Regardless of which of the above mentioned materials and processing techniques are used to form the thermal mass 140, the present invention provides a thermal mass 140 with low porosity and low internal void and interstitial spaces thereby providing the thermal mass 140 with a high thermal conductivity for high heat transfer between the heating elements through the thermal mass 140 to the fluid flowing through the channels in the thermal mass, as described hereafter.

The mass 40, as described in greater detail hereafter, includes a fluid flow path between an inlet 42 and an outlet 44. The inlet and outlet 42 and 44, respectively, each receives a fitting 46 for receiving a fluid sealed connection to a fluid flow conduit, element or tube, not shown. The inlet 42 will be connected to receive the pump output from the window wash fluid reservoir 20; while the outlet 44 will be connected to the spray nozzle(s) 14.

As vehicles typically have several spray nozzles 14, usually one for each of the two windshield wipers, and at least one nozzle 14 for the rear backlight or rear window wiper, it will be understood that the following description of a single heater module 10 for heating all of the fluid discharge from the fluid reservoir 20 will encompass multiple parallel paths, each containing a separate heater module, for heating fluid from the reservoir 20 for each different nozzle 14.

The heat exchange mass 40 is disposed within an enclosure or housing formed by a first cover 50 and a second mating cover 52. The first and second covers 50 and 52 have complementary mating edges. The first cover 50 has a major wall surface 54 and a surrounding peripheral lip 60.

A necked-down end portion 64 is formed in the first cover 50, and forms a tubular extension from one portion of the major wall surface 54. The necked-down portion 64 forms an enclosure for receiving a connector assembly 70 which provides electrical signals and power to the heating element(s) mounted in the joined first and second covers 50 and 52 and to a circuit board, described in detail hereafter.

The second cover 52 also has a major wall surface 56 and a surrounding peripheral lip 62 projecting therefrom. The peripheral lip 62 surrounds the entire periphery of the second major wall surface 56.

The first and second covers 50 and 52 are fixedly joined together, after the thermal mass 40 and the connector assembly 70 has been disposed within the first and second covers 50 and 52 by suitable means, such as by heat, sonic or vibration welding. By example, a peripheral groove 76 projects at least partially around the entire edge of the peripheral lip 60. The groove 76 receives a mating projection 77 extending around the peripheral lip 62 of the second cover 52. The projection 77 and groove 76 are fixedly and sealingly joined together by welding to fixedly join the covers 50 and 52 together.

Locating means are provided for locating and fixing the thermal mass 40 to the first and second covers 50 and 52. At least one and preferably a pair of circumferentially spaced slots 79 and 81, are formed on webs 83 extending between two bosses receiving the threaded fasteners on the mass 40. The slots 79 and 81 receive projections 85 and 87 carried on flanges in the first and second covers 50 and 52 at circumferentially spaced locations complementary to the location of the slots 79 81 in the mass 40. The projections 85 and 87 are welded together when the covers 50 and 52 are subjected to a sonic, heat or vibration welding process. In this matter, the thermal mass is fixedly positioned within the covers 50 and 52 when the covers 50 and 52 are themselves joined together.

Figure 3:
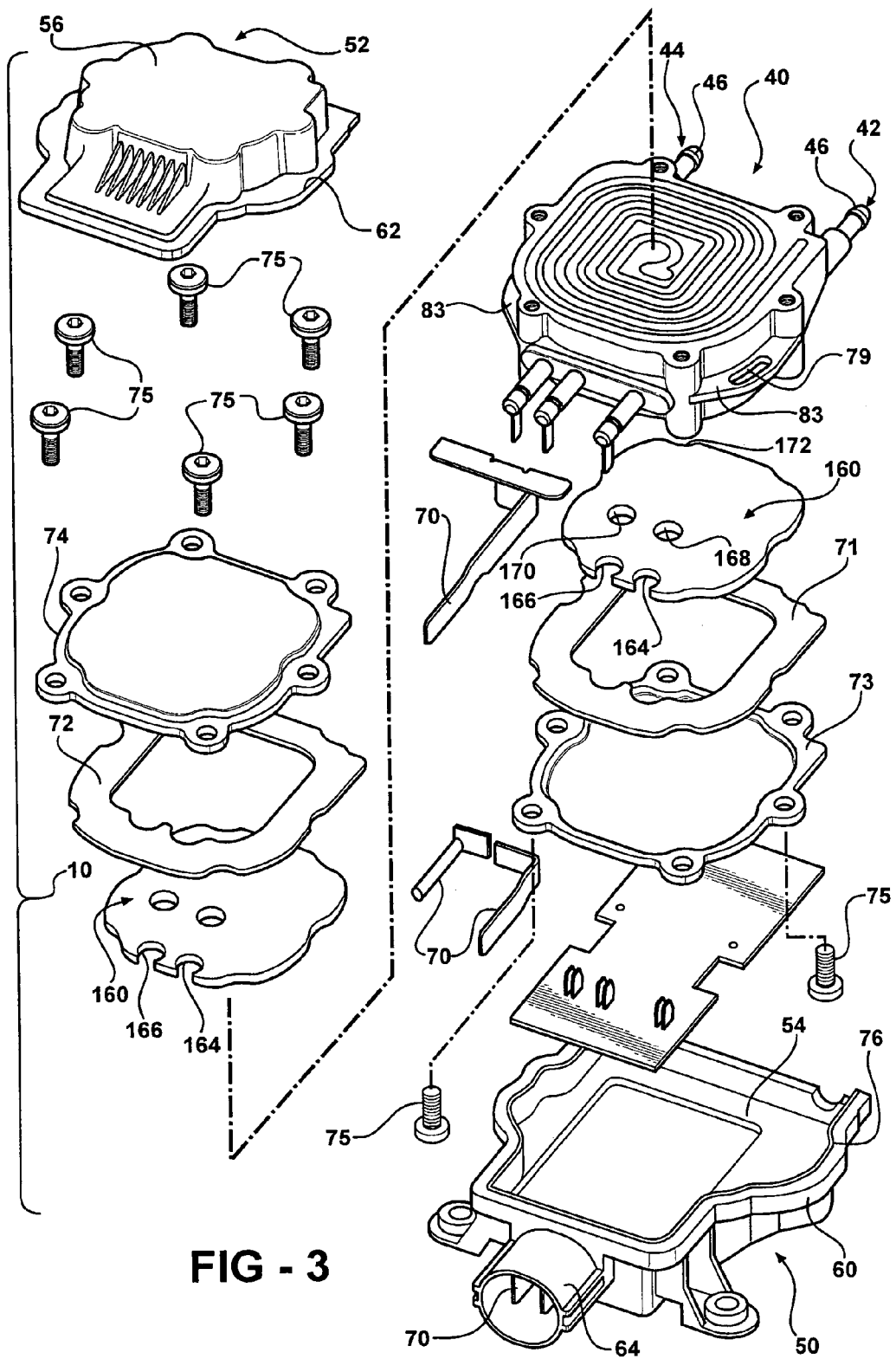
FIG. 3 is an exploded perspective view of the heater module shown in FIG. 2.

A pair of seal elements 71 and 72, each having a ring shape with another edge substantially the same as the peripheral shape of the heat exchange mass 40 are disposed on opposite surfaces of the heat exchange mass 40 as shown in FIG. 3. The seal members 71 and 72 are formed of a high thermal resistant, insulating material. The seal members 71 and 72 seal the periphery of the heat exchange mass 40.

Upper and lower closures or plates 73 and 74, each also having a shape complimentary to the shape of the heat exchange mass 40, are disposed in contact with the upper and lower seals 71 and 72, respectively, and fixed thereto by suitable fastening means, such as nuts and bolts 75, which extend through apertures in each of the upper and lower plates 73 and 74, and peripherally located bores in heat exchange mass 40. The solid peripheral edges of the plates 73 and 74 and the mating peripheral edges of the heat exchange mass 40 trap the seals 71 and 72 there between to seal the joint between the plates 73 and 74 and the mass 40. The upper and lower plates 73 and 74 are formed of a good thermally conductive material, such as aluminum.

As shown in detail in FIGS. 6–11, the heat exchange mass 40 has a solid cubical shape formed of a first major surface 80, a second opposed major surface 82, and four sidewall portions 84, 86, 88 and 90, interconnecting the first and second surfaces 80 and 82.

A plurality of bores 92, 94 and 96 are formed in the body 40 and project inwardly from the sidewall 84. The bores 92, 94 and 96 are each adapted for receiving one generally cylindrical heater element. As partially shown in FIG. 11, each bore 92, 94 and 96 extends through the solid central portion of the mass 40 so as to be completely surrounded by the solid material of the mass 40. This defines the mass 40 as a heat source after receiving heat from the heater elements mounted in each bore 92, 94 and 96.

In the invention, the heater elements may be formed of "calrod". Although different materials may be used, one example of a calrod construction is a Nichrome wire inside of a stainless steel sheath.

By way of example only, at least one and preferably a plurality, i.e., two or three or more individual heater elements 100, 102 and 103, are disposed in the bores 92, 94 and 96, respectively. The function of the one or more heater elements, such as heater elements 100, 102 and 103 will be described hereafter in conjunction with a description of the operation of the heater module 10.

Figure 4:
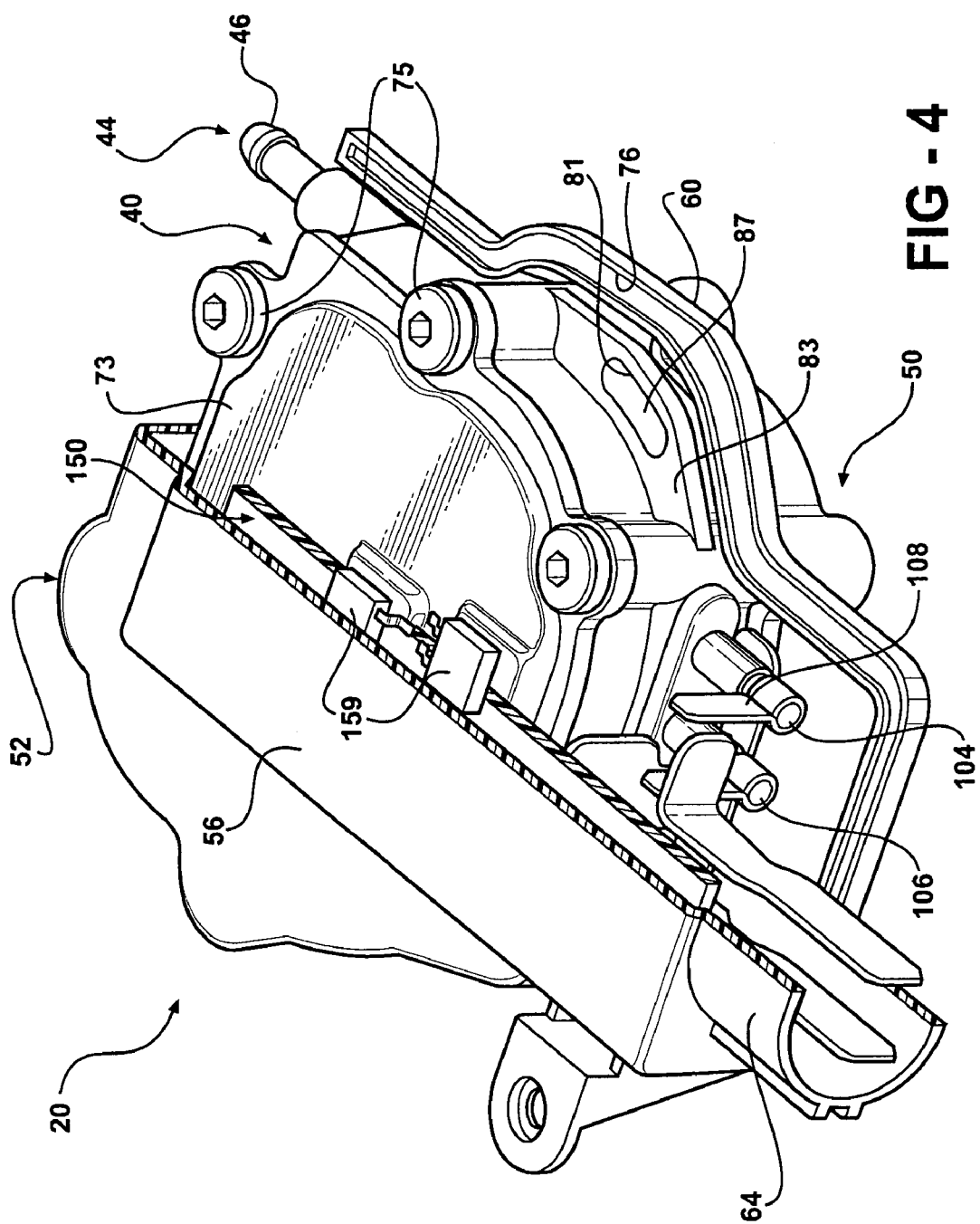
FIG. 4 is a partially broken away, perspective view of the assembled heater module shown in FIG. 2, oriented with the circuit board upward.
Figure 5:
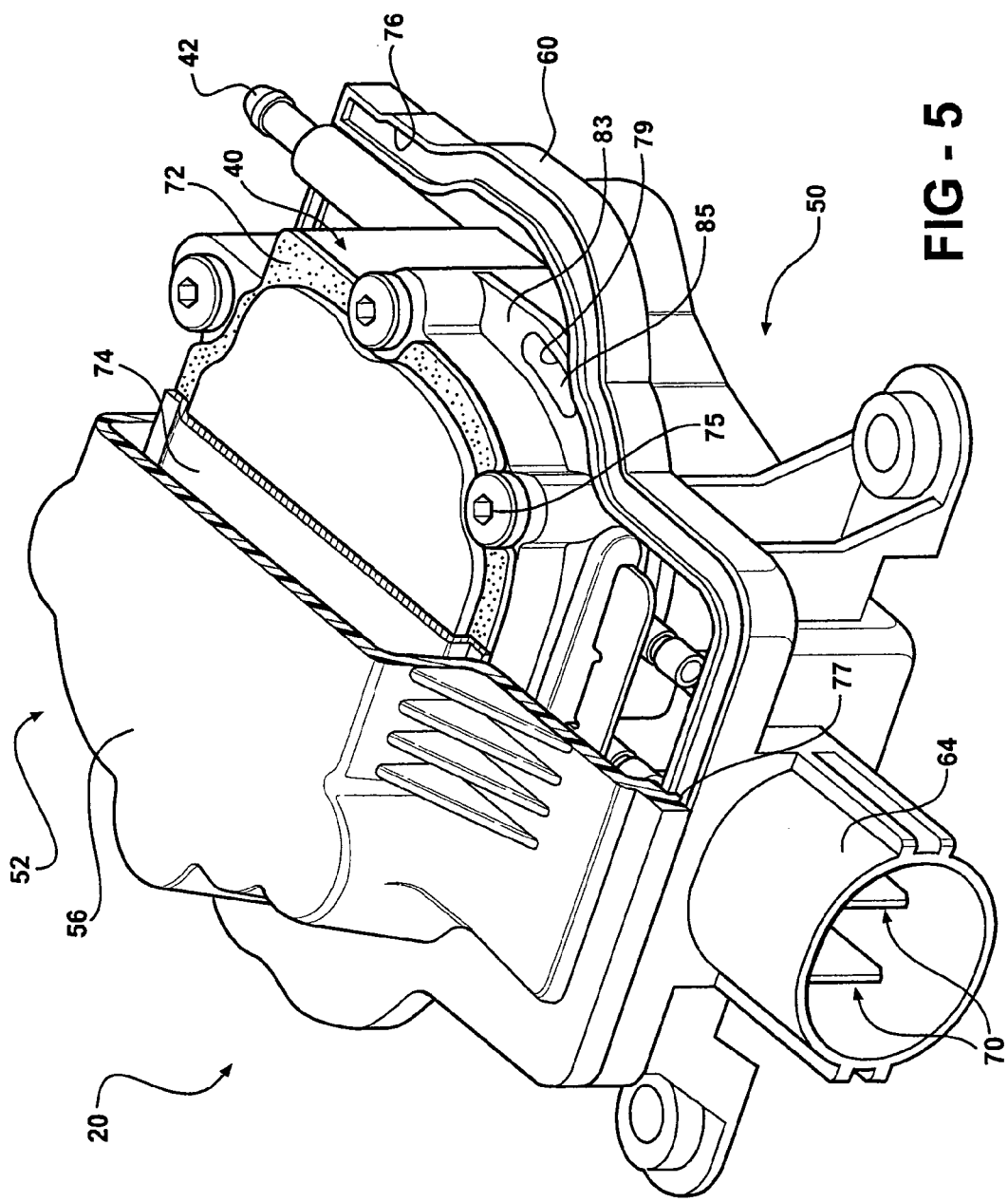
FIG. 5 is a partially broken away, perspective view of the heater module shown in FIG. 2, with the opposite surface oriented upward.
Figure 6:
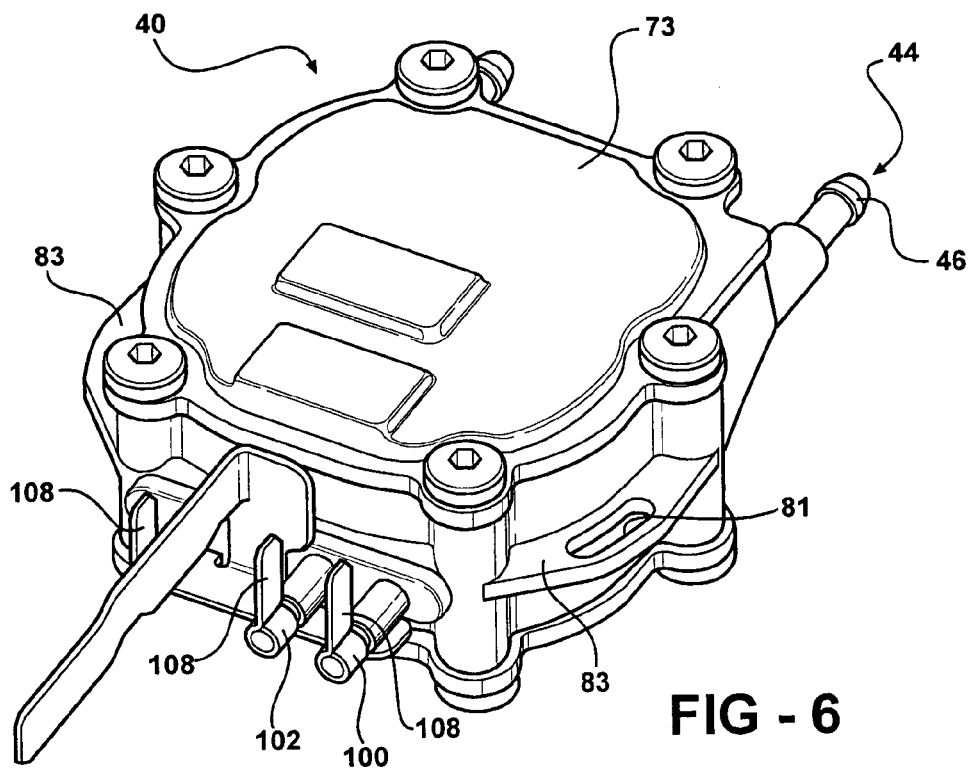
FIG. 6 is a perspective view of the heater module in the orientation of FIG. 5 of the present invention, without the covers and the circuit board.
Figure 7:
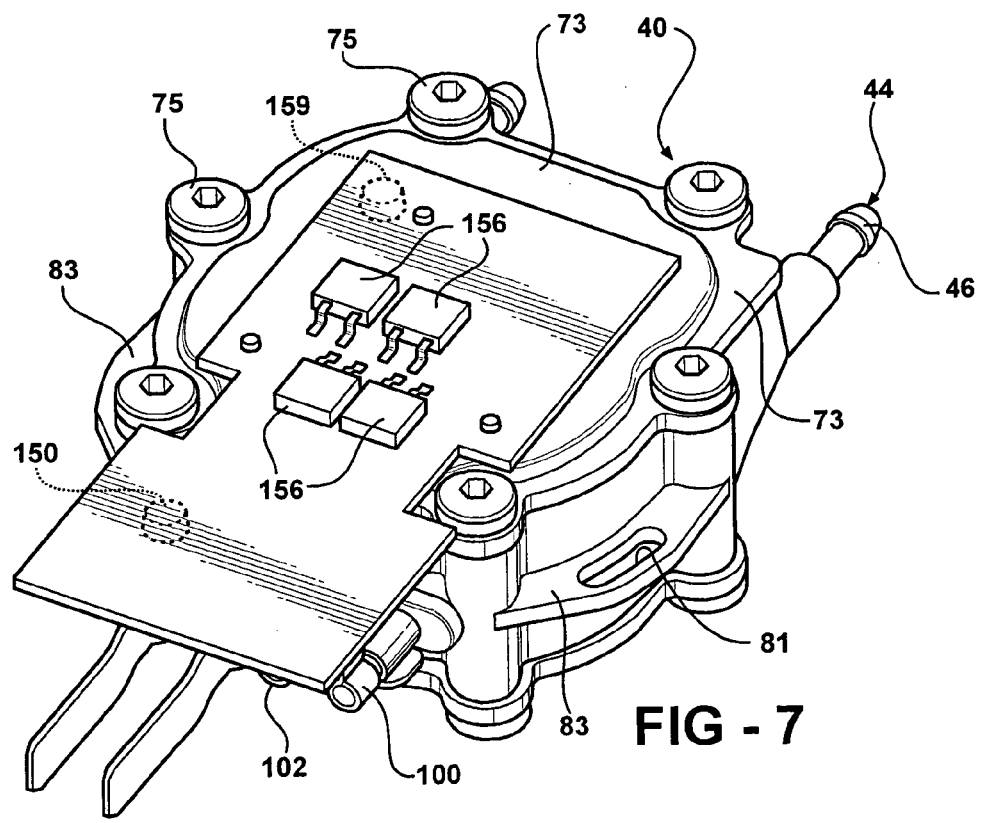
FIG. 7 is a perspective view of the circuit board side of the heater module, without the covers.

As seen in FIGS. 4 and 7, one end 104, 106 and 107 of each heater element 100, 102 and 103, respectively, projects outwardly through the sidewall 84 of the body 40. The ends 104, 106 and 107 of the heater elements 100, 102 and 103, respectively, each have individual terminals 108 extending therefrom and joined thereto by soldering, welding, etc., for connection to mating sockets or contact spring mounted on a printed circuit board 150, itself mounted by means of fasteners, i.e., screws, rivets, or adhesives, etc., to an exterior surface of the plate 73. Conductive traces in the printed circuit board 150 are connected to sockets or contacts which receive the terminals 108. Two of the connector terminals 70 are soldered to the printed circuit board 150 to receive power, ground and control signals from the vehicle electrical system.

Figure 9:
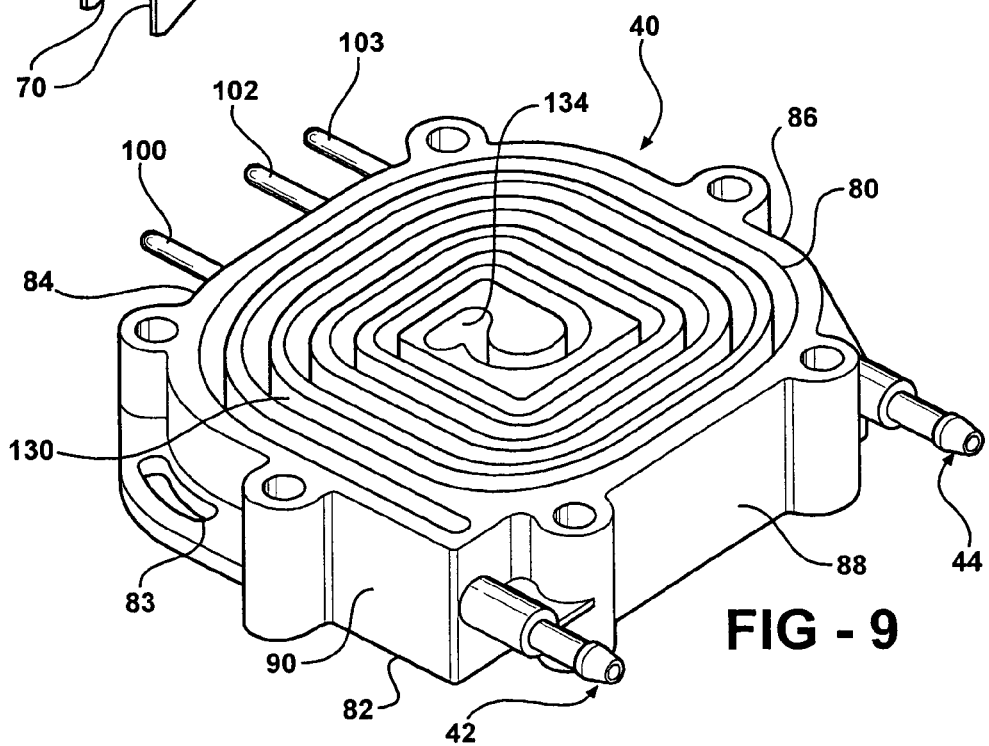
FIG. 9 is a top perspective view of the heater module thermal mass.
Figure 10:
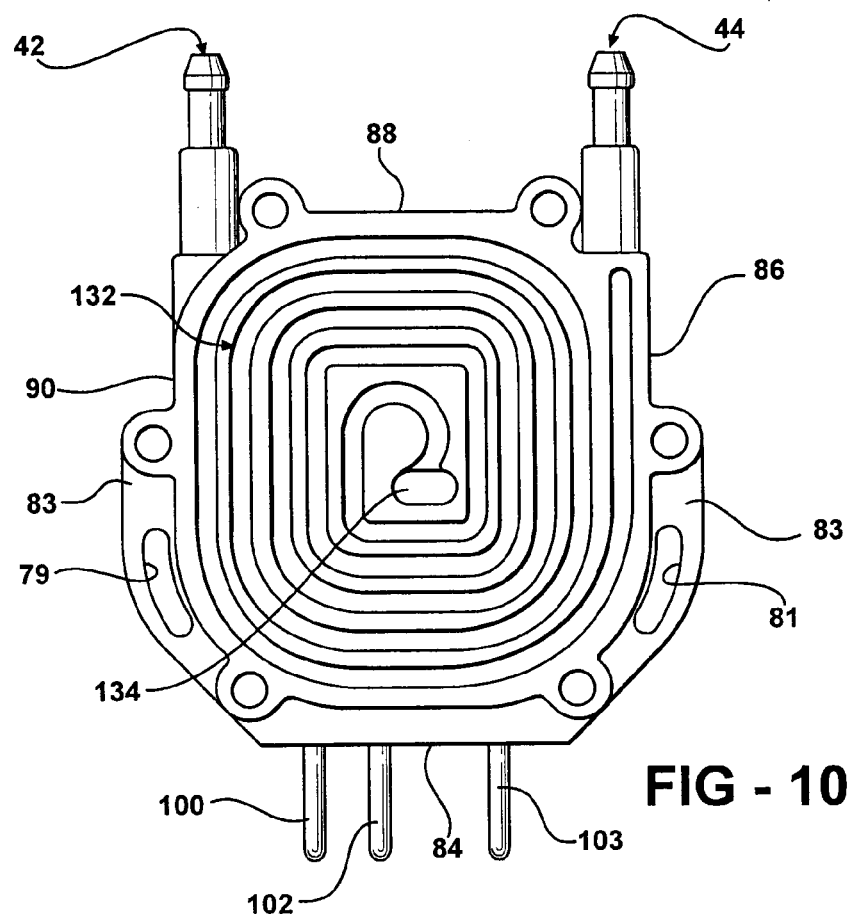
FIG. 10 is a bottom elevational view of the heater module thermal mass shown in FIGS. 6–8.
Figure 11:
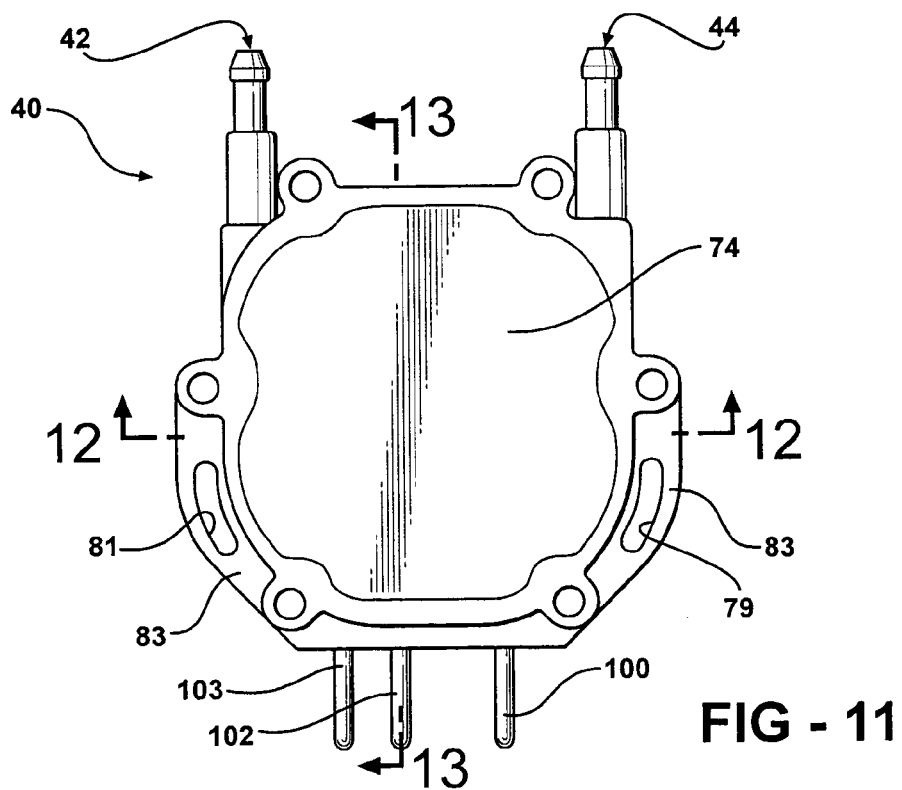
FIG. 11 is an enlarged plan view of the heater module shown in FIGS. 6–8.

As shown in FIGS. 9 and 10, the thermally conductive mass 40 includes a fluid flow channel or path which extends from the inlet 42 to the outlet 44. The fluid flow path is, by example, a labyrinthian path formed of a first fluid flow path portion 130 and a second fluid flow path or channel 132 which are connected at a generally centrally disposed bore 134. The first fluid flow channel 130 has a generally spiral shape formed of alternating straight and arcuate sections which alternately create laminar and turbulent flow of the fluid passing through the first flow channel 130 to maximize the heat absorption of the fluid from the adjoining walls of the mass 40. Further, the first fluid flow channel 130 has an inward directed spiral shape from the inlet 42 to the bore 134 to minimize temperature differential between adjoining portions of the spiral shaped first flow channel 130.

As shown in FIG. 10, the second fluid flow channel 132 has a substantially identical spiral shape. However, fluid flow through the second fluid flow channel 132 is in an outward spiral direction from the bore 134 to the outlet 44.

Thus, fluid flow through the first and second flow channels 130 and 132 starts from the inlet 44 then continues in a spirally inward directed manner through the first flow channel 130 to the central passage or bore 134. Upon exiting the central passage 134 into the second flow channel 132, fluid flow progresses in an outward spiral direction through the second flow channel 132 to the outlet 44.

In operation, the heater module 40 will be interconnected in the vehicle wash fluid flow lines between the pump 22 and the spray nozzle(s) 14 as shown in FIG. 1. The external connector is then connected to the connector housing 70 to provide electric power from the vehicle battery 26 and the controller 28 to the heater elements 100, 102 and 103, in the heat exchange body 40.

Assuming that the first and second fluid flow channels 130 and 132 in the body 40 are filled with fluid, when the controller 28 activates the heater elements 100, 102 and 103, the heater elements 100, 102 and 103 will begin radiating heat which will immediately raise the temperature of the entire surrounding portion of the heat exchange body 40. Heat from the body 40 will, in turn, be radiated to and absorbed by the fluid disposed in the first and second flow channels 130 and 132.

The straight and arcuate portions of the first and second fluid flow channels 130 and 132 create alternating turbulent and laminar flow regions in the fluid flowing through the mass 40 which causes movement of the fluid in the first and second flow channels 130 and 132 bringing all molecules in the fluid in contact with the wall of the body 40 forming the first and second flow channels 130 and 132 to efficiently absorb the maximum amount of heat possible. This causes the temperature of the fluid to be quickly raised from ambient temperature at the inlet 42 to approximately 160° F.–170° F. at the outlet 44 in approximately sixty seconds.

The fluid in the first and second fluid flow channels 130 and 132 removes or absorbs heat from the thermal mass 40 thereby increasing the fluid temperature by physical contact with the mass 40. The heater elements 100, 102 and 103 maintain the heat of the thermal mass 40 at a predetermined temperature thereby preventing hot spots from occurring in the fluid. Normally, hot spots would occur when the fluid comes in direct contact the heater elements 100, 102 and 103. Fluid which is not in physical contact with the heater elements 100, 102 and 103 passes the heater elements 100, 102 and 103 by and does not absorb heat. By heating the thermal mass 40, the physical hot contact area is increased along with an increase in heat transfer efficiency. This requires less energy to heat the same volume of fluid.

Although a single heater element 100 may be employed as the heat source in the body 40, multiple heater elements, with two or three heater elements, 100, 102 and 103, being described by way of example only, have been found to be most advantageous. The controller 28 can activate all of the plurality of heater elements 100, 102 and 103 upon receiving a first command to dispense heated wash fluid onto the windshield 12. This generates a maximum amount of heat to the body 40 to immediately and quickly raise the temperature of the body 40 high enough to transfer sufficient heat to the fluid in the fluid flow channels 130 and 132 to raise the temperature of the fluid to the desired discharge temperature of about 65° C. to about 70° C. The multiple heater elements 100, 102 and 103 can remain in an activated state by the controller 28 if immediate and successive commands from the on/off switch 24 are supplied by the vehicle driver to supply additional charges of fluid onto the windshield 12.

At the completion of the fluid dispensing operation, and during other periods of non-fluid dispensing while the vehicle engine is running or the engine is running and a dashboard mounted switch, for example, is activated, the controller 28 can cyclically activate one or more of the heater elements, such as heater element 100, to maintain the temperature of the fluid in the first and second flow channels 130 and 132 at an elevated temperature for immediate discharge onto the windshield 12 when activated by the on/off switch 24. This minimizes electrical power requirements on the vehicle battery 26.

Although the controller 28 can provide separate switchable signals to each of the heater elements 100, 102 and 103, in order to control each heater element 100, 102 and 103 separately under program or logic control, one alternate approach includes a bi-metal element or a switch mounted between the power connections to one terminal 108 and each of the other terminals 108 connected to the additional heater elements 102 and 103. The bi-metal element can be set to open at a predetermined temperature, such as 50° C., thereby deactivating the associated heater element. This enables the additional heater elements 102 and 103, for example, to remain deactivated until a high heat requirement is initiated.

Although the following description of the use of high amperage switching devices known as MOSFETs, are used as part of the controller 28 and to provide the necessary high current, typically 50 amps at 12 volts, to the heating elements 100, 102 and 103 in the thermal mass 40, other high amperage switching devices may also be employed. Any number of MOSFETs 156 can be mounted in any configuration on the printed circuit board 150.

A plurality of bores 158 are optionally formed through the printed circuit board 150. The bores 158 improve heat flow between the switching devices on the printed circuit board (PCB) 150 and the underlying first plate 73.

A temperature sensor 159, such as a PTC, is mounted on the printed circuit board 150, typically over or adjacent to the bores 158. The temperature sensor 159 measures the temperature of the printed circuit board 150 and provides a temperature proportional signal to the controller 28 which is used by the controller 28 to control the on/off cycle of the heater elements 100, 102 and 103.

Figure 8:
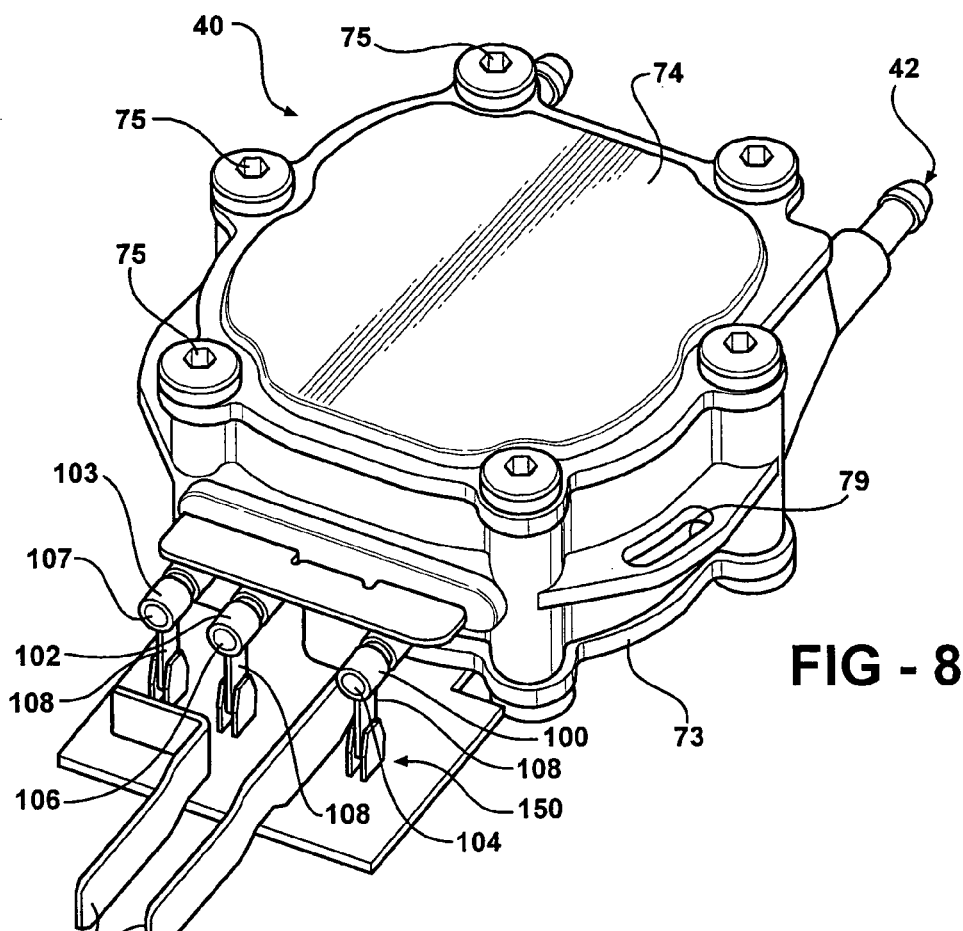
FIG. 8 is a perspective view of the opposite orientation of the heater module shown in FIG. 7.

To further enhance transfer of the heat generated by the MOSFETs 156 to the first plate 140, a highly conductive pad or plate 161, hereafter referred to as a sill pad 161, is interposed in contact between the printed circuit board 150 and the first plate 23 as shown in FIGS. 3, 8 and 9. The sill pad 161 typically has a planar shape and dimensions to extend over at least a portion of the first plate 73. The pad 161 isolates stray electrical currents to negative ground through the screws 75, provides a positive contact between the MOSFETs and the thermal mass 40, and stabilizes heat loss through the adjacent cover by maintaining the temperature of the plate 73 at a higher temperature to thereby create a lower temperature differential or gradient with respect to the thermal mass 40.

The sill pad 161 preferably has a higher thermal conductivity than the thermal conductivity of the plate 73 to efficiently draw heat generated by the MOSFETs 156 to the plate 73 thereby maintaining the temperature of the plate 73 at an elevated temperature. This elevated temperature of the plate 73 is higher than the normal temperature of the plate 73 caused by heat escaping from the sides of the thermal mass 40 around the seals 71 and 72.

It is known that during sub-freezing temperatures, wash fluids which are formed substantially of water are subject to freezing. The expansion of the frozen or semi-frozen fluid causes pressure to be exerted against the surrounding components of the heater module 10 which could lead to leaks or to the complete destruction of the heater module 10.

As shown in FIGS. 3, 5 and 11–14, a fluid expansion means 160 is carried in the heater module 10 for reversibly allowing expansion of the fluid in the fluid flow path when the fluid changes phase from a liquid to a substantially solid state. The fluid expansion means, in one aspect of the present invention, is in the form of a thin compressive member such as a generally planar member, formed of a closed cell foam.

One example of a suitable material which could be used to form the fluid expansion means is a closed cell polyolefin foam sold by Voltek, division of Sekisui America Corp., as product number VOLARA type LM. Another possible material is a polyvinyl chloride allied foam, trade name C/3002 or C-2301 from Specialty Composites Division Cabot Safety Corp., Indianapolis, Ind. 46254.

The fluid expansion means 160 has sufficient rigidity under normal fluid operating pressures in the mass 40 to resist compression. The fluid expansion means or member 160 is disposed over an inner edge of each of the seals 71 and 72 on both sides of the thermal mass 30 and has a substantial center portion facing and exposed to the fluid through the open ends of the channels in the thermal mass 40. The fluid expansion member 160 has sufficient rigidity to resist expansion or compression under the normal operating pressures of the fluid in the heater module 10. However, at the substantially higher forces exerted by freezing and expansion of the fluid in the channels, the member 160 is capable of compression as shown in phantom in FIGS. 12 and 13 to allow space for the expanded frozen or semi-frozen fluid.

The fluid expansion member 160 has shape memory so as to return to its normally generally planar shape, completely filling an internal cavity 162 formed in an enlarged bulge in each cover 71 and 73.

The fluid expansion member 160 is compressed by the fastening on the plate 73 and 74 to the mass to expand slightly into the channels in the mass 40 and into substantial contact with the surfaces of the thermal mass 40 to close off the open ends of each of the channels in the fluid flow path through the thermal mass 40.

Figure 14:
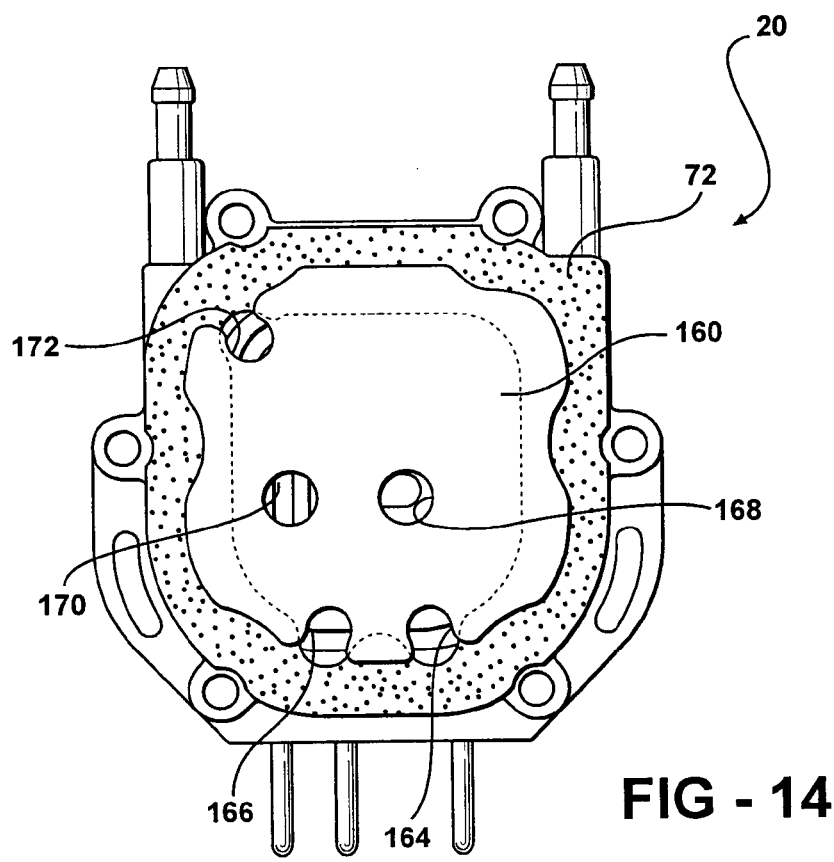
FIG. 14 is a plan view of the freeze protection element shown mounted over the seal on one surface of the thermal conductive.

As shown in FIG. 14, the fluid expansion member 160 has additional features to facilitate its use in the heater module 10. A pair of open ended recesses 164 and 166 are formed along one edge of the fluid expansion member 160. The recesses 164 and 166 overlay a portion of the underlying fluid flow channel of the thermal conductive mass 40 to permit a small amount of the fluid in the fluid flow channel to flow through the recesses 164 and 166 against the inside surface of the plate 73 or 74. The high power consuming electronic switching devices, such as the MOSFETs 156, are located immediately opposite an enlargement in the plate 73.

The switching devices 156 are cooled by the flow of water so as to maintain the switching devices 156 at a nominal operating temperature. Additional apertures 168 and 170 are formed in an intermediate portion of the thermal expansion member 160 for a similar purpose to allow fluid flow through the channels in the thermal conductive mass to flow against an inner surface of the adjacent plate 73 to remove heat from the switching devices 156 located immediately there over on the circuit board 150.

An additional open-ended recess 172 is formed on another edge portion of the thermal expansion member 160. The recess 172 underlies the position of the thermal temperature sensor 159 mounted on the circuit board 150. Fluid flow through the recess 172 provides a more accurate temperature measurement by the temperature sensor 159 since it is closer to the fluid flowing through the channels in the thermal mass 40.

Figure 16:
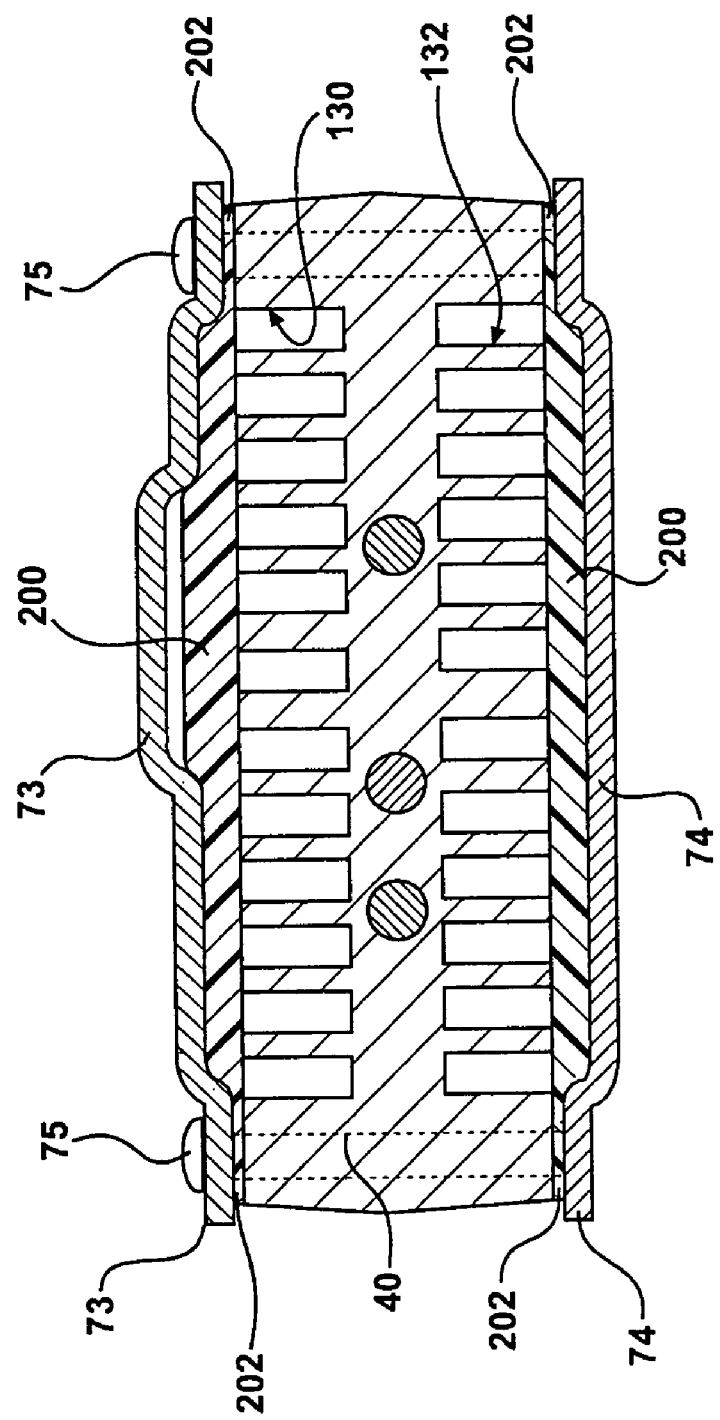
FIG. 16 is a cross-sectional view, generally similar to FIG. 12, but showing another aspect of the present invention.
Figure 19:
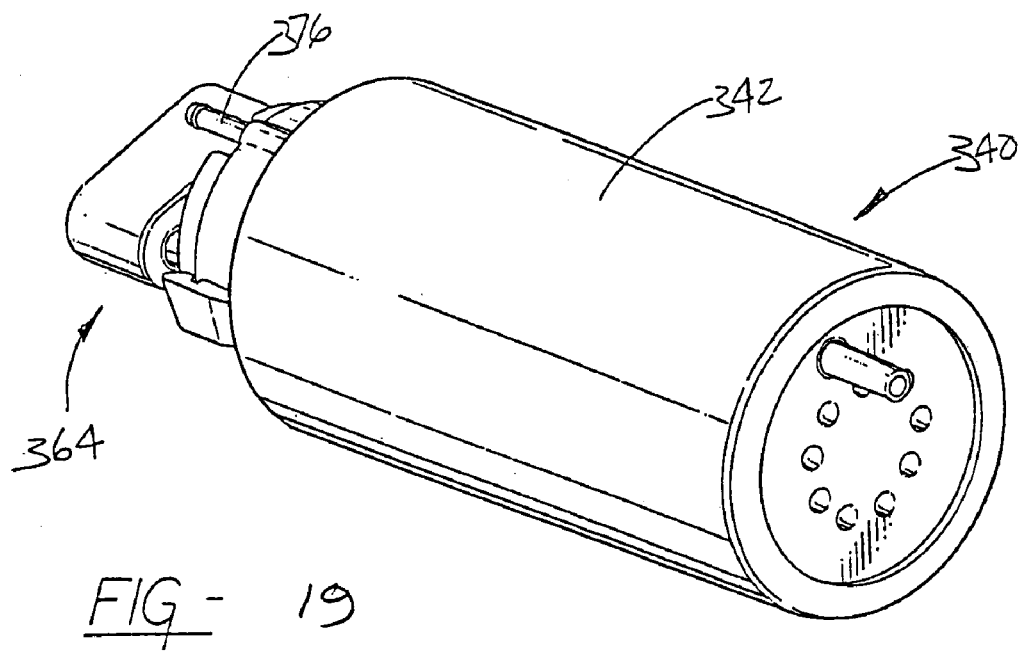
FIG. 19 is a bottom perspective view of the heater apparatus shown in FIGS. 17 and 18.

In another aspect of the fluid expansion means 200 shown in FIG. 16, the fluid expansion means 200 is configured to eliminate the seal 71 and 72. The peripheral edge portion 202 of the fluid expansion means or element is compressed when the corresponding plate 73 or 74 is securely fixed to the thermal mass 40 by means of the fasteners 75. Alternately, the peripheral edge portion 202 of the fluid expansion means 200 can be heat and pressure compressed to a smaller thickness than the central portion of the fluid expansion element 200.

Figure 15:
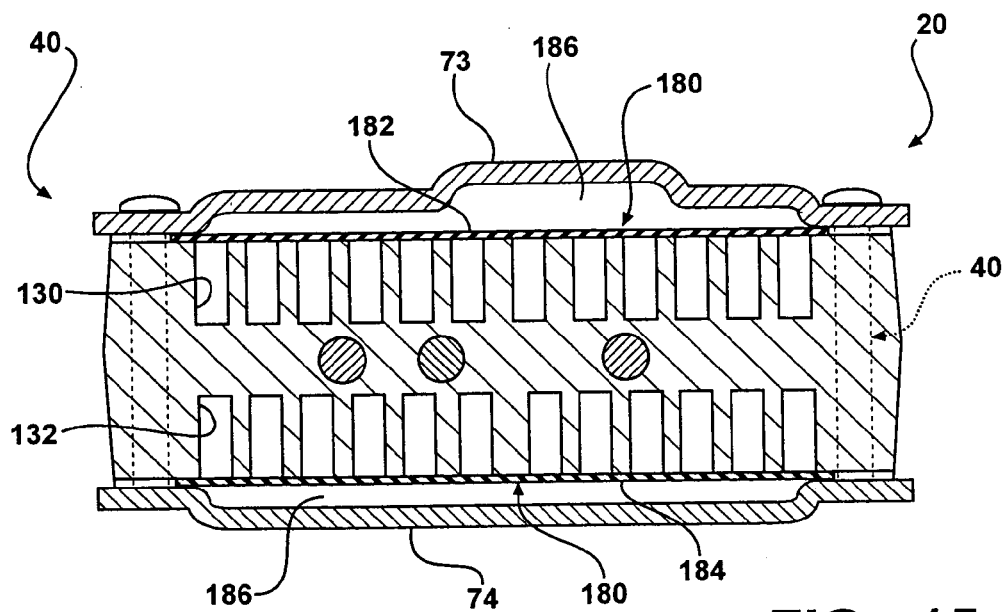
FIG. 15 is a side elevational view of another aspect of a heater module which an alternate fluid expansion member according to the present invention.

In an optional modification shown in FIG. 15, the fluid expansion means 180 is formed by the seal members 182 and 184 having a solid shape over their entire surface area. At least one of the thus formed seal members 182 and 184 is formed with sufficient rigidity to resist expansion when exposed to the normal pressures of fluid flowing through the open ended channels in the thermal mass 40. However, any of the seal members 182 and 184 are capable of expansion into an interior cavity or chamber 186 formed in the enlarged portion of the plate 73 between the seal 182 and the inner surface of the plate 73 to accommodate the expanded frozen or semi-frozen fluid from the mass 40. When the fluid subsequently changes phase back to a liquid state, the seal members 182 and 184 will assume their original shape wherein each of the seal members 182 and 184 is disposed in contact with the open ends of the channels closing off the open end of the channels in the fluid flow path to maintain the desired labyrinthian flow of fluid through the thermal mass 40 as described above.

Referring now to FIG. 17, there is depicted another aspect of a heater apparatus or module 310 constructed in accordance with the teachings of the present invention. Although the following use of the heater module 310 of the present invention is described in conjunction with a vehicle window wash system as shown in FIG. 1, it will be understood that the present heater module may be employed in other applications requiring heated fluid, such as any cleaning system used to clean any vehicle window, i.e., the windshield, rear backlight, or side windows, as well as cleaning systems for vehicle mirrors, camera, lenses, or sensor covers, etc.

Referring back to FIG. 1, the wash fluid 16 is supplied from a fluid source, such as a reservoir or container 20. The fluid in the reservoir 20 is pumped to the nozzle(s) 14 by means of a pump 22 usually located in close proximity or attached to the reservoir 20.

As is conventional, an on/off switch 24, which may be mounted on a vehicle steering column stalk switch, is supplied with power from the vehicle battery 26 and enables the vehicle driver to control the on or off operation of the wash pump 22.

According to the invention, the wash fluid pumped from the reservoir 20 to the spray nozzles 14 is heated from ambient temperature to a predetermined higher temperature, such as 160° F.–170° F., by example only, by the heater module 310. A suitable control circuit or controller 28 is provided for controlling the operation of the heater elements in the heater module 310. The controller 28 is also supplied with electric power from the vehicle battery 26. The controller 28 is activated by an "on" signal from the vehicle ignition 30 so as to heat the fluid contained within the flow paths in the heater module 310, as described hereafter, whenever the vehicle ignition is in an "on" state.

An optional on/off switch 25 may be connected between the battery 26 and the controller 28 to provide on and off operation for the entire heater system by disconnecting power to the controller 28. This enables the heater system to be activated or remain in an inactive state at the selection of the vehicle driver. As described hereafter, the on/off switch 25 may also be replaced by a separate input signal to the controller 28 from an external signal source, such as a vehicle body controller, to provide for selective deactivation of the heater module 310 under certain circumstances, such as a thermal event, low battery power, etc.

The heater module 310 is shown in greater detail in FIGS. 18–29. The heater module 310 includes a housing 340 formed of a generally cylindrical, tubular sleeve 342 having a hollow throughbore extending between opposed ends. The sleeve 342 is formed of a thermal insulating material, such as a foam plastic material, to thermally insulate the high temperature fluids passing through a heat exchange, thermally conductive mass 350 mounted within the housing 340.

As shown in FIG. 18, the heat exchange mass or body 350 is mounted within the sleeve 342. The heat exchange mass 350 is held in position within the sleeve 342 by a top end cover 352 and a bottom end cover 354 both of which are fixedly mounted to opposite ends of the sleeve 342 by suitable means, such as swagging, welding, threads, etc.

Figure 20:
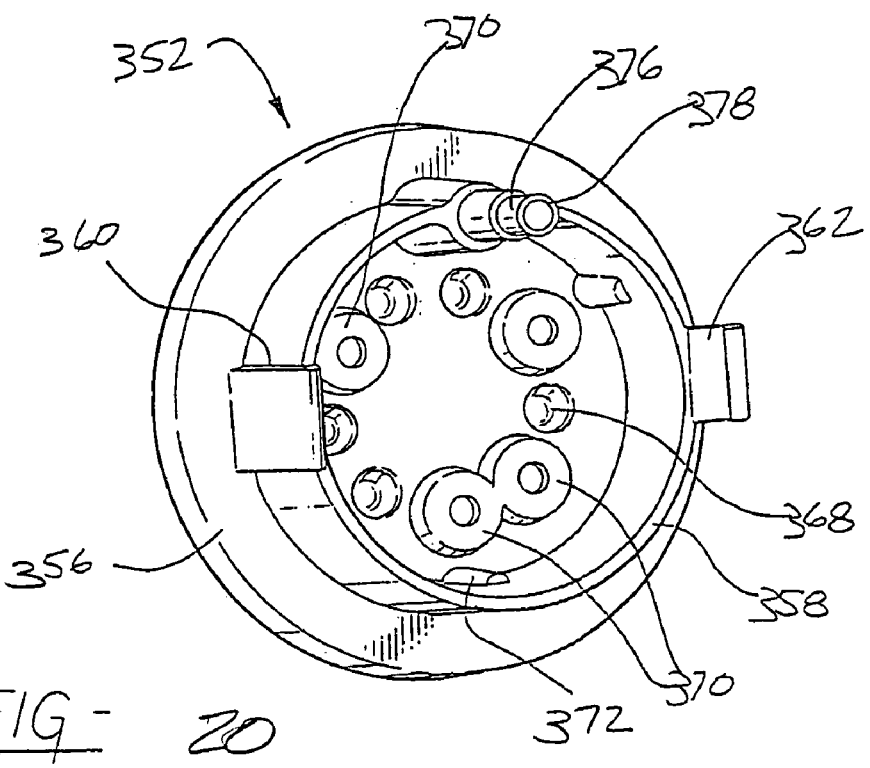
FIG. 20 is an inside perspective view of the top end cover of the heater apparatus shown in FIG. 18.

As shown in FIGS. 18 and 20, the top end cover 352 includes an enlarged diameter end flange 356 at one end and a generally circular sleeve 358 projecting therefrom to an opposite end. Side tabs 360 and 362 project along diametrically opposed portions of the sleeve 358 and outward from the end of the sleeve 358 for connection to ridge 364 on a housing 394. The end flange 356 is adapted to seat against one end of the heat exchange mass 350 within the interior of the sleeve 342. The sleeve 358 projects axially from the flange 356 and is adapted to mate with an electric connector housing 364 and an electric terminal assembly 366, both described in greater detail hereafter.

A plurality of circumferentially arranged dimples 368 are formed in the end flange 356 within the interior of the sleeve 358. Interspersed within the dimples 368 are a plurality of bosses 370, with four being shown by way of example only. Each boss 370 includes a throughbore or aperture 371 which is adapted to receive a cylindrical heating element 372 or a ground rod 374 or a ground lead frame, as described hereafter.

As also shown in FIGS. 18 and 20, an inlet port fitting 376 is also formed in the top end cover 352, integrally with the sleeve 358, by way of example only. A bore 378 extends through the fitting 376 and the end flange 356.

The heater elements 372 or the ground rod 374 may be formed of any suitable heating element. In one aspect, the heater element 372 are formed of "calrod". Although different materials maybe used, one example of a calrod construction is a Nichrome wire inside of a stainless steel sheath.

As shown in FIG. 18, a flange 375 is formed on one end of the sheath of each heater element 372 and ground rod 374. The flange 376 supports a seal element 377, such as an O-ring, for sealing the mounting connection between the heater elements 372 and the ground rod 374 and the top end cover 352.

Figure 21:
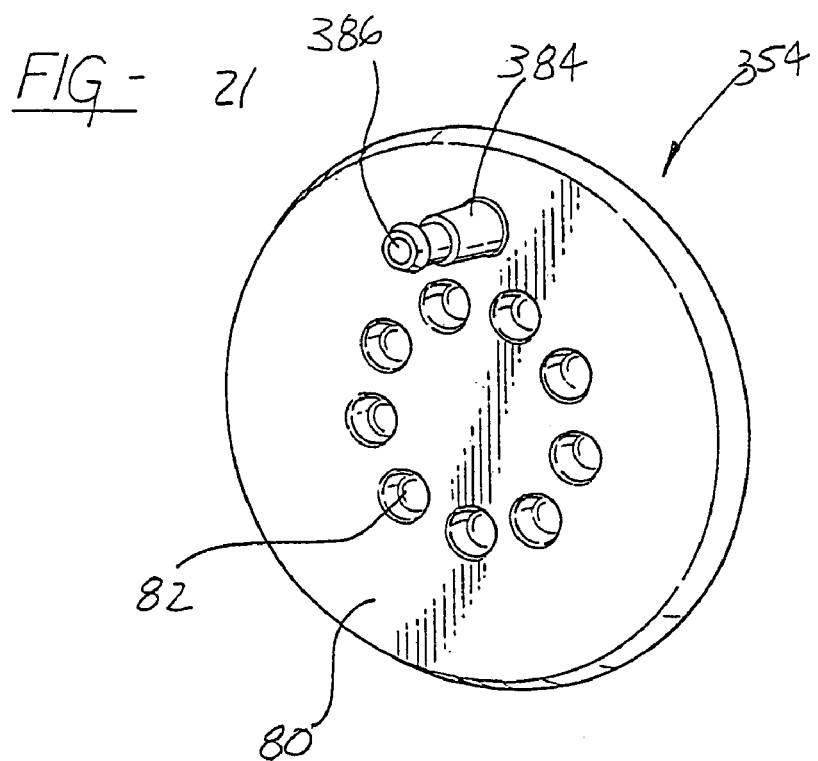
FIG. 21 is a perspective view of the base and cover of the heater apparatus shown in FIG. 18.

The bottom end cover 354 is shown in detail in FIGS. 18 and 21. The bottom end cover 354 has a generally planar wall 380 with a circular cross-section so as to be fixed to an inner end of the sleeve 342 as shown in FIG. 20. A plurality of dimples 382 are formed in a circumferentially spaced, circular arrangement in the wall 380 of the bottom end cover 354 and are arranged to project into certain apertures in the heat exchange mass 350 as will be described in greater detail hereafter. An outlet port or fitting 384 projects from the wall 380. A throughbore 386 extends through the port or fitting 384 and the wall 380 for communication with the interior of the inner sleeve 342.

Figure 22:
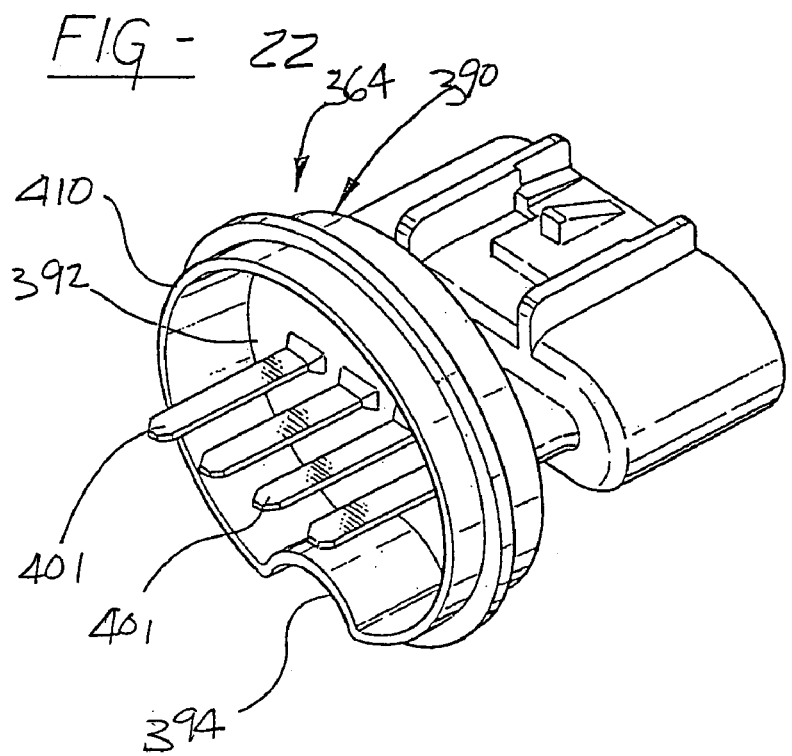
FIG. 22 is a top perspective view of the connector housing of the heater apparatus shown in FIG. 18.

The electrical connector housing 364 is fixed within one end of the inner sleeve 342. The connector housing 64 is formed as an integral, one piece body 390 of a suitable electrically and thermally insulating plastic as shown in FIGS. 18 and 22. The body 390 includes a first generally circular end portion 392 having a key or detent 394 at one circumferential position. The first end portion 392 forms an interior recess which surrounds one end of terminal leads 401. The terminal leads 401 are fixedly mounted in the first end portion 392, such as through slots formed in a central wall of the first end portion 392. One end of the terminal leads 401, not shown, is connected to a circuit board 366, shown in FIG. 19, containing control circuitry mounted in the interior of the first end portion 392.

The terminal leads 401 extend from the second end portion 392 of the connector housing 364 to an electrical contact connection with the exposed end of the inner wire portion of each heating element 372 or ground rod 374.

Figure 23:
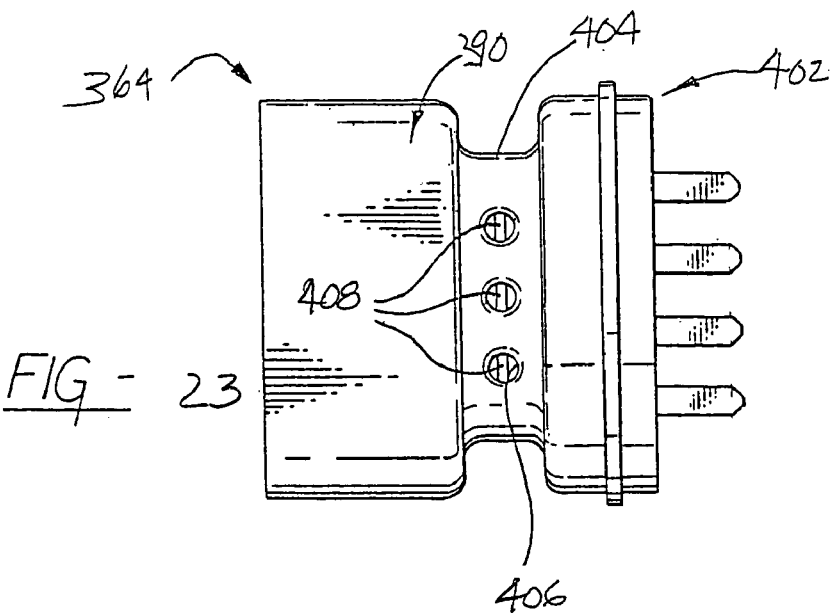
FIG. 23 is a bottom elevational view of the connector housing shown in FIG. 22.

A second portion 402 of the connector housing 364 has a generally rectangular shape with rounded ends and is connected to the first portion 390 by a narrow rib 404 having a plurality of through apertures 406 formed therein as shown in FIG. 23.

Figure 24:
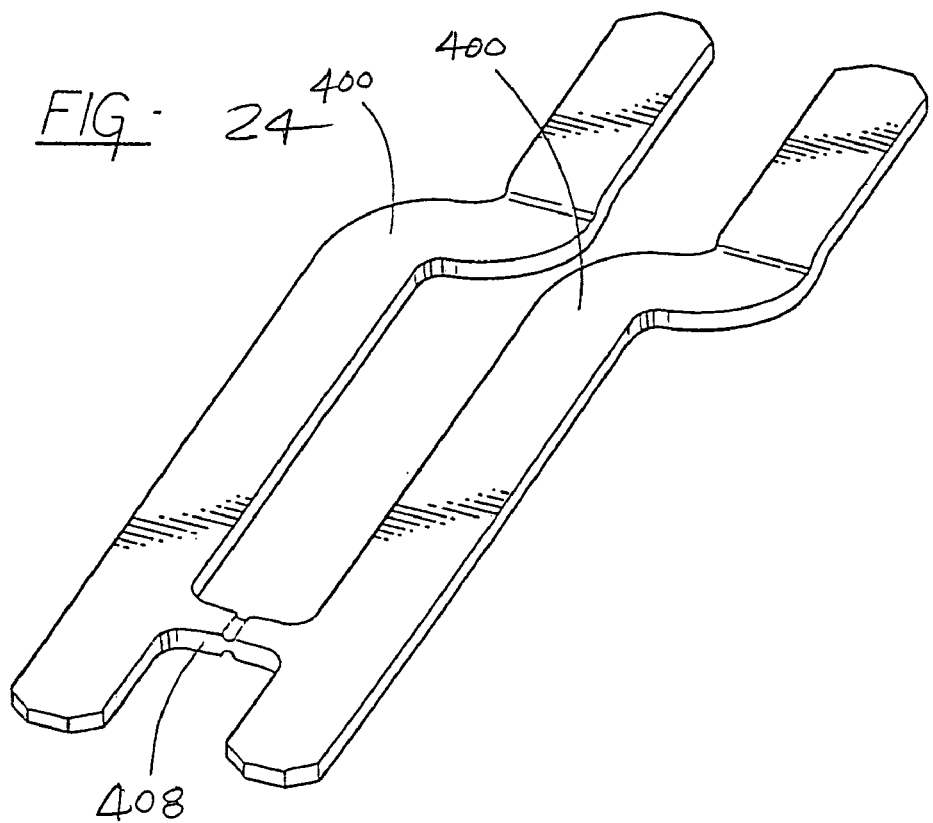
FIG. 24 is a perspective view of a terminal lead assembly shown in FIGS. 18, 22 and 23.

Terminal leads 400, as shown in detail in FIG. 24, are initially joined by frangible webs 408 in pairs or groups of three or four leads 400. The terminal leads 400 are mounted through an interior wall in the first end portion 392 of the connector housing 364 so that the webs 408 connecting the terminal leads 400 together are exposed through the apertures 406 in the web 404 as shown in FIGS. 23 and 22. After the terminal leads 400 are fixedly mounted in the connector housing 364, the webs 408 are separated or broken away from the terminals or leads 400 to separate each terminal 400 from the other terminal leads 400. The terminal leads 400 are exposed in the second portion 402 of the connector housing 364 and mate with a plug containing complementary sockets for connecting electrical power, ground and external signals to the terminal leads 400. The other end of the terminal leads 400 are mounted in sockets or soldered to terminals on the circuit board 366 mounted in the first end portion 92 of the connector housing 364.

As shown in FIG. 18, at least one and preferably a pair of diametrically opposed latch elements 379 are formed on the connector housing 364. The latch elements 379 mate with a latch receiver or recess in the top end cover 352 to latchingly couple the connector housing 364 to the top end cover 352 and sandwich the circuit board 366 between adjacent end flanges of the connector housing 364 and the top end cover 352.

Figure 25:
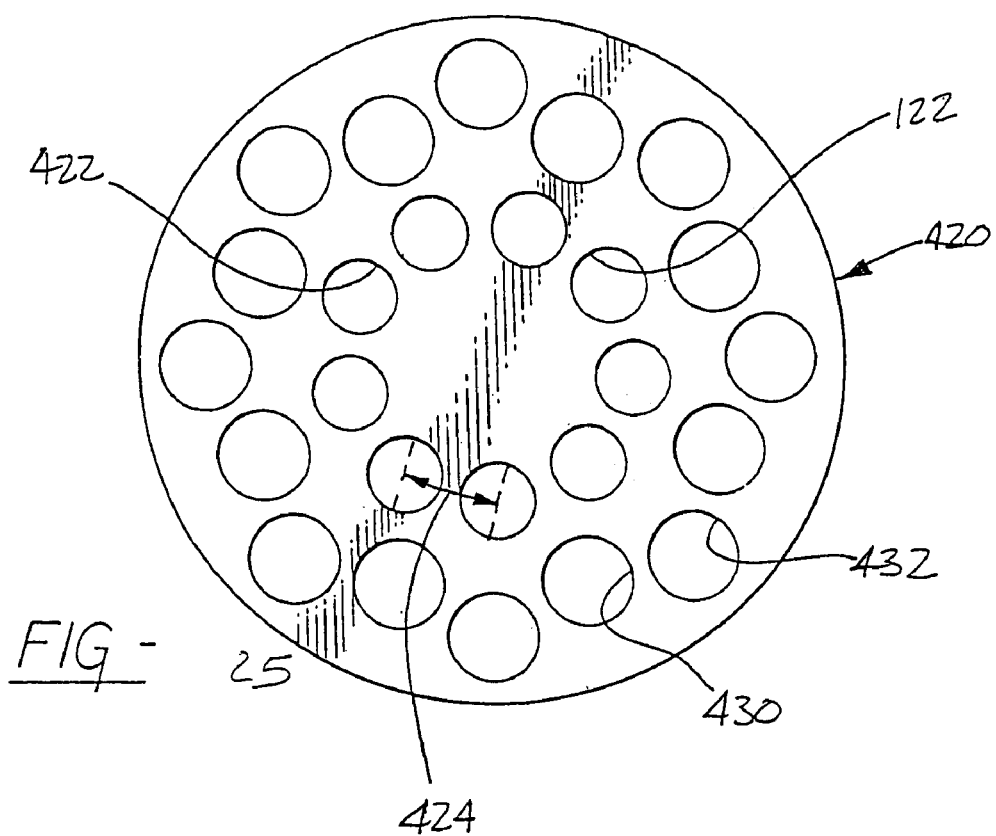
FIG. 25 is a plan elevational view of a heat exchange lamina used in the heater apparatus of the present invention.

As shown in FIG. 18 and in detail in FIGS. 26–29, the heat exchange mass 350, also hereafter referred to as a "stack", is formed of a plurality of individual heat exchange elements or lamina 420 as shown in FIG. 25. Each lamina 420 has the same identical shape, such as a circular cross-section, so as to fit tightly within the inner diameter of the inner sleeve 342, and is formed as a thin plate of a suitable highly thermal conductive material, such as aluminum, ceramic, pressed alumina particles, etc.

Each lamina 420 may be formed by the molding or casting processes described above for the thermal mass 140. That is, casing or molding as a semi-solid material by spin casting, thixocasting or rhiocasting, will form each lamina 420 with the lowest porosity for maximum thermal conductivity. Each lamina 420 may also be molded from poltruded carbon materials, as well as a metal such as aluminum.

The use of an extrusion process is ideally suited for forming each lamina 420 individually or as one continuous block or mass. The block or mass may be cut to length to provide a predetermined heat transfer capability for the fluid system. In additional, using known extrusion techniques, it is possible to form the helical flow paths in the mass as the mass exits the extrusion die by rotating the extrusion die itself or the extrudate discharge from the extrusion die during extrusion.

Figure 26:
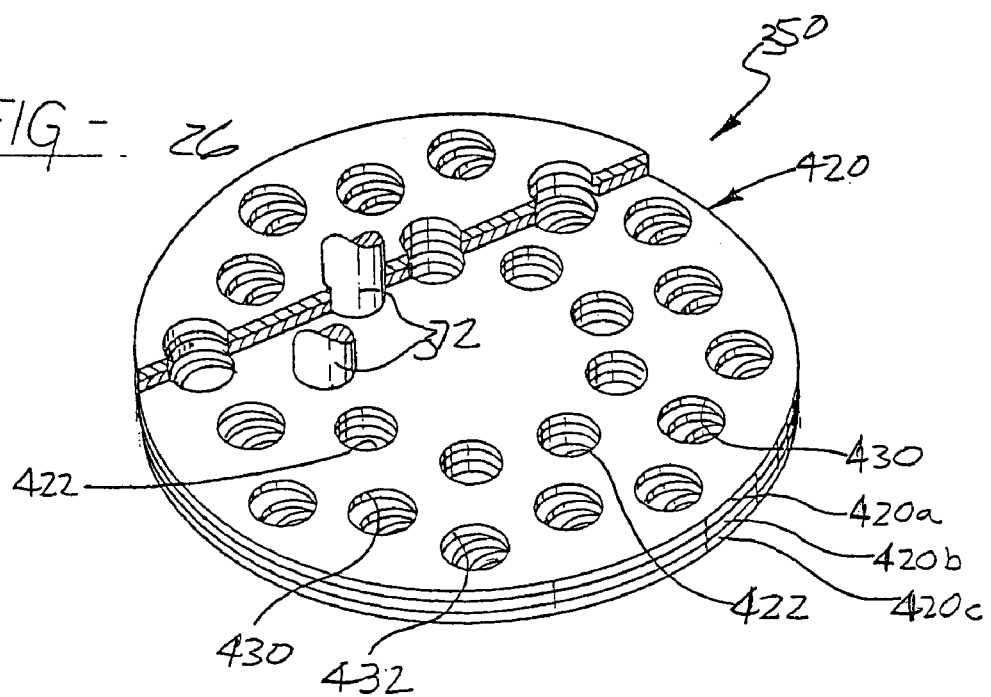
FIG. 26 is a partly broken away, partial perspective view of the assembled heat exchange stack of the heater apparatus according to the present invention.

As shown in FIGS. 25 and 26, each identically constructed lamina 420, including lamina 420a, 420b and 420c are provided with a plurality of inner apertures 422 which are in a generally circular arrangement at a defined circumferential, center to center spacing denoted by reference number 424. This spacing 424 is hereafter used to define a "helical offset".

The inner diameter of the apertures 422 is sized to slidably receive the cylindrical heater elements 372 or the ground rod 374 in any aperture 422. Thus, despite any helical or angular offset between adjacent lamina 420a, 420b and 420c, as described hereafter, either in a single step, a double step, a triple step, a quintuple step helical offset, etc., the apertures 422 in each lamina 420a, 420b, 420c, etc., will remain longitudinally coaxially aligned with the apertures 422 in the adjacent lamina 420a, 420b and 420c. This enables the apertures 422 in the entire heat exchange mass or stack 350 to form elongated, axial throughbores 426 seen in FIG. 27, which slidably receive one of the heater elements 372 or the ground rod 374. The heater elements 372 and the ground rod 374, once inserted into the bores 426 in the heat exchange stack 350 , will also retain the lamina 420 in the desired helical offset arrangement as defined hereafter.

Referring back to FIGS. 25 and 26, each lamina 420, 420a, 420b, 420c, etc., also includes a plurality of outer radially disposed apertures arranged in two groups of apertures including an inner group of apertures 430 and an outer group of apertures 432. It will be understood that this arrangement is by example only as the apertures 430 or 432 can be arranged in other configurations. However, the circumferentially spacing between the equal radially spaced inner apertures 430 and the different but still equal radially spaced outer group of apertures 432 disposed at a greater radially spacing then the inner group of apertures 430 provide an optimum number of flow paths through the stack 350 for heat exchange efficiency with fluid flowing through the stack 350 as described hereafter. As shown in FIGS. 25 and 26, the apertures 430 and 432 alternate around the circumference of each lamina 420.

Figure 27:
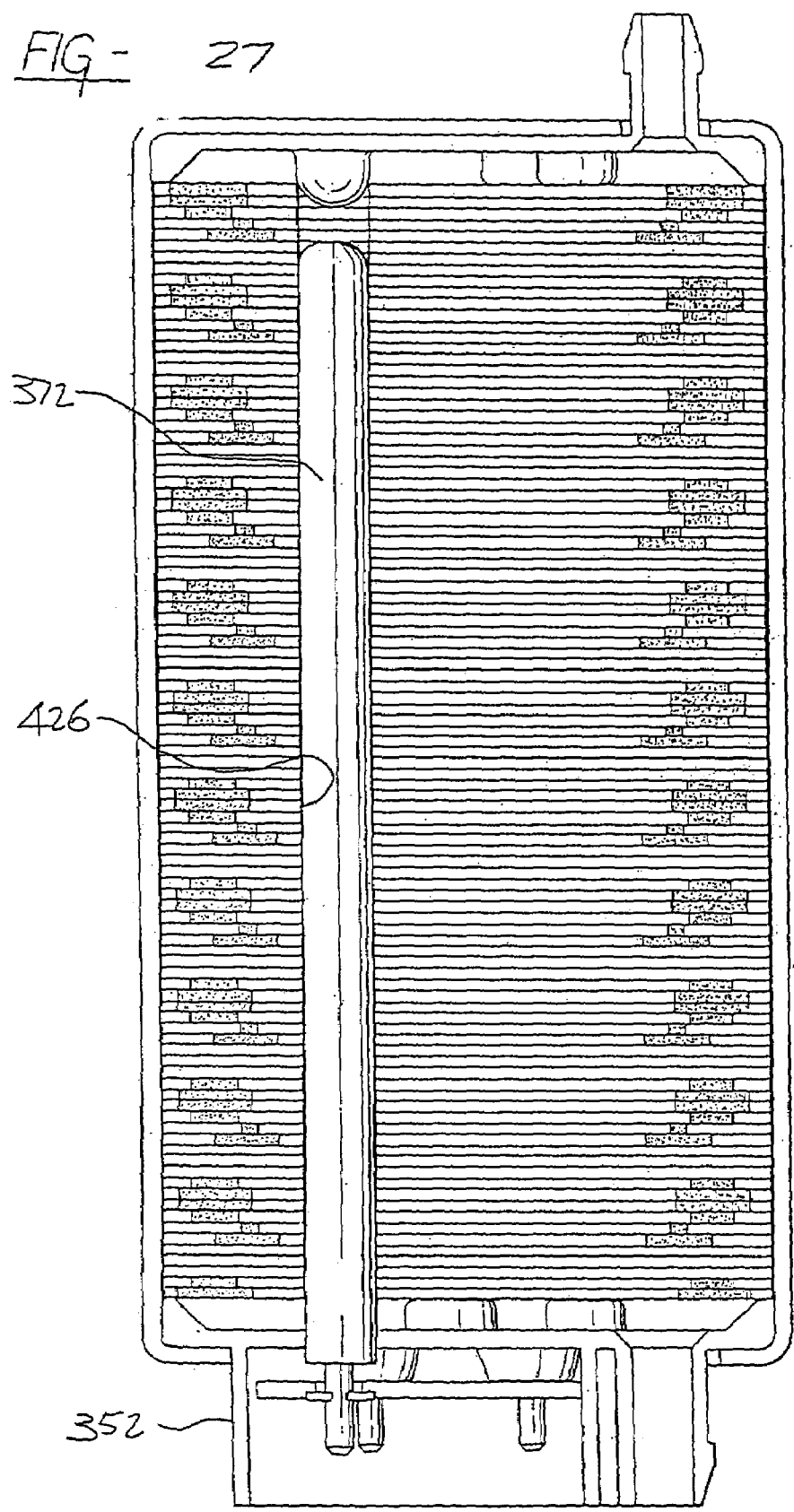
FIG. 27 is a side elevational view of the complete heat exchange stack of the heater apparatus shown in FIG. 18.
Figure 28:
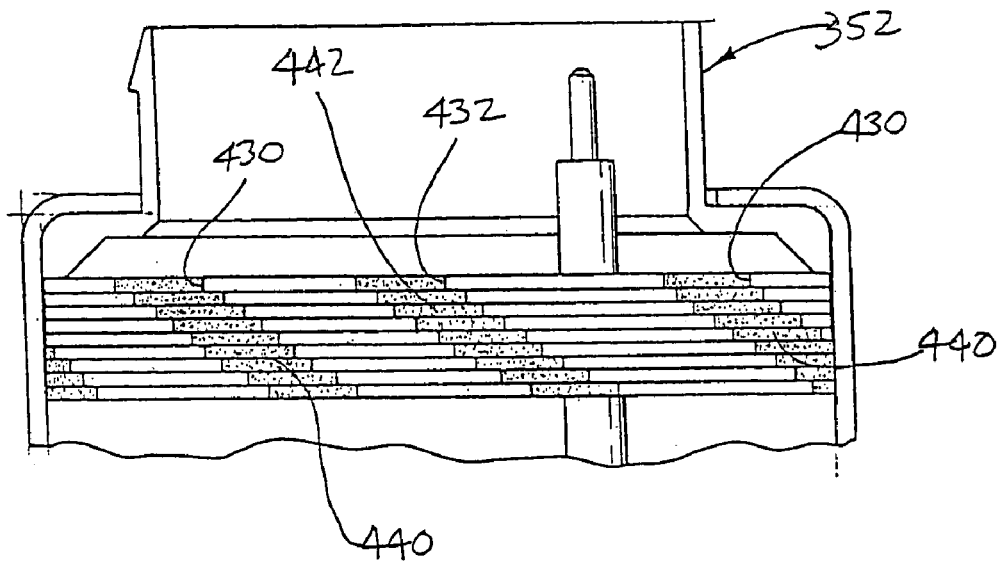
FIG. 28 is a side elevational, pictorial representation of the helical flow paths through the heat exchange stack shown in FIG. 27, with the outer housing broken away and the circularly disposed, helical flow paths shown pictorially in a two dimensional representation.

As shown in FIGS. 26 and 28, for a single step helical offset, the lamina 420 are arranged in stack including lamina 420a, 420b, 420c, etc., with each lamina rotatably offset from one adjacent lamina, as viewed from the top end cover 352 in FIG. 27, by one circumferential center or helical offset to center spacing 424 of the apertures 422 which receive the heater elements 372. This provides a helically extending, stepwise flow path denoted by reference number 440 for the inner series of apertures 430 and reference number 442 for the outer series of apertures 432. This single step helical offset example shown in FIG. 28 significantly increases the surface area of the stack which is exposed through each helically extending bore or fluid flow path 440 and 442 and provides for greater heat absorption by the fluid flowing through the flow paths 440 and 442 due to the increased contact time between the fluid and the surfaces of the lamina 420 forming the fluid flow paths 440 and 442, etc., as compared to an arrangement where all of the apertures 430 are axially aligned with like apertures 130 in adjacent lamina 420 and the apertures 432 are likewise axially aligned with like apertures 432 in the adjacent lamina 420.

Each fluid flow path, such as fluid flow path 440 and 442, helically extends between the inlet chamber formed between one surface of the top end cover 352 and one end of the stack 350 and the outlet chamber formed between the bottom end cover 354 and the opposed end of the stack 350. Depending on the length of the stack 350, the flow paths 440 and 442, for example, can extend approximately 540° around a longitudinal axis of the stack 350 between the inlet and the outlet. This extending length, as compared to a straight throughbore or flow path, greatly increases the contact time between the fluid and the surrounding surfaces of the stack 350 so as to enable greater quantities of heat to be absorbed from the lamina 420 by the fluid to increase the efficiency of the heater module 310 of the present invention.

Figure 29:
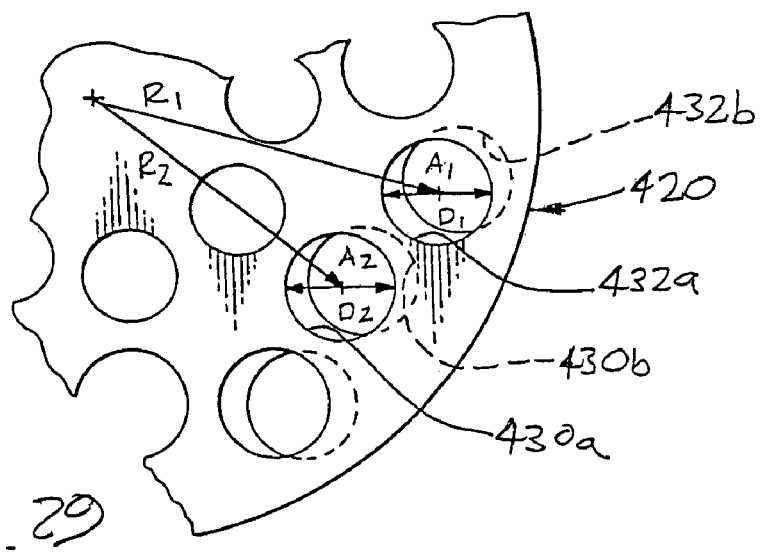
FIG. 29 is a partial, enlarged view of one of the heat exchange stack lamina according to the present invention.

Other features of the apertures 430 and 432 can be more clearly understood by referring to FIG. 29. As shown therein, the outer apertures 432 denoted in FIG. 29 as outer apertures 432a and 432b for two different lamina 420a and 420b, are disposed at a first radius $R_1$. The apertures 430a and 430b in the lamina 420a and 420b are disposed at a different, smaller radius $R_2$. Similarly, the diameter or maximum cross-section of the outer apertures 432a and 432b is greater than the diameter or maximum cross-section of the inner disposed apertures 430a and 430b. However, the helical offset which results in a step wise circumferential advance from the aperture 430a in the adjacent lamina 420a and between the aperture 432b in the lamina 420b from the aperture 432a in the lamina 420a still results in the same cross-section area in each of the bores 430 and 432 formed by the inner apertures 430 (430a, 430b, etc.,) and the outer apertures 432 (432a, 432b, etc.,). This forms equal cross-sectional flow paths and equal resistance to fluid flow in each of the helical bores 440 and 442 thereby creating equal flow rates through each of the bores 440 and 442 throughout the entire heat exchange stack 350.

In operation, with the heater module 310 assembled together as described above, a fluid supply from the pump 322 can be attached to the inlet fitting 376. Similarly, another conduit connected to the spray nozzle(s) 314 can be connected to the outlet 384. When the ignition 326 is turned "on", the controller 28 supplies power to the one or more heater elements 372 disposed in certain of the inner bores 422 in the stack 350. To quickly raise the temperature of fluid contained within the bores 440 and 442, all of the heater elements 372 can be activated. Once the temperature of the fluid in the stack 350 has reached a predetermined temperature suitable for discharge through the nozzle(s) 14, a thermocouple, not shown, connected to the stack 350 or situated in one of the bores 440 and 442 or adjacent the bottom end cover 384 will supply a feedback signal to the controller 328 which will then deactivate one or more of the heater elements 372 until only one heater element 372 is turned on continuously or cyclically to maintain the fluid temperature at the desired discharge temperature, such as 160° F.–170° F. Alternately, if more time is available to heat the fluid, only one or two of the heater elements 374 are activated.

When the vehicle driver activates the on/off switch 324, the pump 322 will be activated to pressurize the fluid delivery line through the heater module 310 to the spray nozzle(s) 14. This will cause the fluid in the stack 350 to be discharged through the outlet 384 to the spray nozzle(s) 14. Cooler fluid will then enter through the inlet 376 and be heated as it flows through the bores 440 and 442 and is discharged through the outlet 384 to the spray nozzle(s) 314.

Although the controller 28 can provide separate switchable signals to each of the heater elements 372 in order to control each heater element 372 separately under program or logic control, one simple approach includes the bi-metal element or a switch mounted between the power connections to one terminal 401 and each of the other terminals 401 connected to the additional heater elements 372. The bi-metal element can be set to open at a predetermined temperature, such as 50° C., thereby deactivating the associated heater element 372. This enables the additional heater elements 372, for example, to remain deactivated until a high heat requirement is initiated.

An important feature of the present invention is the ability to easily vary the total surface area of each bore 440 and 442 so as to vary the amount of the heat which is supplied to the fluid passing through the bores 440 and 442. A single step offset is shown, by example, in FIG. 18. Alternate the step arrangements are possible.

What is claimed is:

1. A heater apparatus for heating fluid, the heater apparatus comprising:
   a one piece low porosity, thermally conductive mass formed of one of a thermally conductive semi-solid state cast material, a molded ceramic, and an extruded material formed of one of a ceramic material and a poltruded carbon;
   heating means, disposed within and thermally coupled to the thermally conductive mass, for imparting heat to the thermally conductive mass; and
   a fluid flow path formed in the mass between an inlet and an outlet, the fluid flow path coupled in heat transfer relation to the heating means so that fluid in the fluid flow path absorbs heat from the thermally conductive mass, the fluid flow path open to the exterior of the thermally conductive mass.

2. The heater apparatus of claim 1 further comprising:
   control means, connected to the heating means, for activating the heating means.

3. A heater apparatus for heating fluid, the heater apparatus comprising:
   a thermally conductive mass, the thermally conductive mass formed of an extruded, low porosity material;
   heating means, thermally coupled to the thermally conductive mass, for imparting heat to the thermally conductive mass;
   a fluid flow path formed in the mass between an inlet and an outlet, the fluid flow path coupled in heat transfer relation to the heating means so that fluid in the fluid flow path absorbs heat from the thermally conductive mass, the fluid flow path open to the exterior of the thermally conductive mass, the fluid flow path defined by a plurality of throughbores extending through first and second ends, the thermally conductive mass formed of a plurality of lamina, each lamina carrying an aperture defining a portion of the throughbores and an aperture defining a position of a bore for receiving the heater means therethrough;

the heater means mounted in the thermally conductive mass concentrically within and surrounded by the plurality of throughbores; and means for coupling a fluid inlet to one end of each of a plurality of throughbores and a fluid outlet to each of the other ends of the plurality of throughbores to define the fluid flow path as at least one parallel flow path between the inlet and the outlet through the plurality of throughbores.

4. The heater apparatus of claim 3 wherein:

the fluid flow path is defined by a plurality of throughbores extending through first and second ends;

the heater means mounted in the thermally conductive mass concentrically within and surrounded by the plurality of throughbores; and means for coupling a fluid inlet to one end of each of a plurality of throughbores and a fluid outlet to each of the other ends of the plurality of throughbores to define the fluid flow path as at least one parallel flow path between the inlet and the outlet through the plurality of throughbores.

5. A heater apparatus for heating fluid, the heater apparatus comprising:

a thermally conductive mass, the thermally conductive mass formed of an extruded, low porosity material;

heating means, thermally coupled to the thermally conductive mass, for imparting heat to the thermally conductive mass;

a fluid flow path formed in the mass between an inlet and an outlet, the fluid flow path coupled in heat transfer relation to the heating means so that fluid in the fluid flow path absorbs heat from the thermally conductive mass, the fluid flow path open to the exterior of the thermally conductive mass, the fluid flow path defined by a plurality of throughbores extending through first and second ends, the plurality of throughbores each having a helical path between opposed first and second ends;

the heater means mounted in the thermally conductive mass concentrically within and surrounding by the plurality of throughbores; and means for coupling a fluid inlet to one end of each of a plurality of throughbores and a fluid outlet to each of the other ends of the plurality of throughbores to define the fluid flow path as at least one parallel flow path between the inlet and the outlet through the plurality of throughbores.

6. The heater apparatus of claim 3 further comprising:

certain lamina rotatably offset from adjacent lamina by an offset distance to create a stepwise helical advance in the throughbore through the stack of lamina between the first and second ends of the stack.

7. The heater apparatus of claim 4 wherein the throughbores define parallel flow paths through the thermally conductive mass.

8. The heater apparatus of claim 4 wherein the heater means comprises:

at least one heater element.

9. The heater apparatus of claim 4 wherein the heater means comprises a plurality of heater elements.

10. The heater apparatus of claim 4 further comprising:

a plurality of bores formed in the thermally conductive mass, concentrically within the throughbores, the bores adapted for receiving the heater means.

11. The heater apparatus of claim 1 wherein the heating means comprises:

at least one heater element mounted in the mass.

12. The heater apparatus of claim 1 wherein the heating means comprises:

a plurality of heater elements mounted in the mass.

13. The heater apparatus of claim 1 wherein:

the heating means is disposed in the thermally conductive mass and substantially encompassed by the fluid flow path.

14. The heater apparatus of claim 1 further comprising:

a housing carrying the thermally conductive mass in an interior cavity.

15. The heater apparatus of claim 14 further comprises:

a closure fixed to the mass for closing the fluid flow channels in the mass; and seal means, mounted over a portion of the fluid flow path in the thermally conductive mass to fluidically seal the thermally conductive mass to the housing.

16. The heater apparatus of claim 14 wherein the fluid flow path comprises:

a first flow path portion extending across one surface of the thermally conductive mass; and a second flow path portion extending across an opposed surface of the thermally conductive mass, the first and second flow path portions disposed in fluid flow communication.

17. The heater apparatus of claim 16 wherein the first and second flow path portions are disposed in fluid flow communication substantially at the center of the thermally conductive mass.

18. The heater apparatus of claim 14 wherein the heating means comprises:

a plurality of heater elements mounted in the mass.

19. The heater apparatus of claim 15 wherein the seal means comprises:

an 0-ring disposed between the peripheral portions of the closure and the thermally conductive mass.

20. A vehicle window wash apparatus comprises:

a fluid source for supplying wash fluid;

a fluid discharge device fluidically coupled to the fluid source for discharging fluid from the reservoir;

a heater means disposed in fluid flow communication between the fluid source and the fluid discharge device;

a controller, coupled to the heater means for supplying power to the heater means;

the heater means including:

a one piece low porosity thermally conductive mass having an inlet and an outlet;

the thermally conductive mass formed of one of a material cast in a semi-solid state, a molded ceramic, and an extruded material formed of one of a ceramic material and a poltruded carbon;

a heater element, disposed within and thermally coupled to the thermally conductive mass, for imparting heat to the thermally conductive mass; and a fluid flow path formed in the mass between the inlet and the outlet, the fluid flow path coupled in heat transfer relation to the heater means so that fluid in the fluid flow path absorbs heat from the thermally conductive mass, the fluid flow path open to the exterior of the thermally conductive mass.

21. A heater apparatus manufactured by a process including the steps of forming a one piece low porosity, thermally conductive mass of one of a thermally conductive semi-solid state cast material, a molded ceramic, and an extruded material formed of one of a ceramic material and a poltruded carbon; associating at least one fluid channel in a thermally conductive relationship with the thermally conductive mass, the at least one fluid flow channel having at least one inlet and one outlet; and associating heater means in a thermally conductive relationship with the thermally conductive mass, the heater means supplying heat, when activated, to the thermally conductive mass, the heater apparatus for heating fluid comprising:

a one piece low porosity, thermally conductive mass formed of one of a thermally conductive semi-solid state cast material, a molded ceramic, and an extruded material formed of one of a ceramic material and a poltruded carbon;

heating means, associated in a thermally conductive relationship with the thermally conductive mass, for imparting heat to the thermally conductive mass, when activated to the thermally conductive mass; and at least one fluid flow channel in a thermally conductive relationship with the thermally conductive mass, the at least one fluid flow channel having at least one inlet and at least one outlet to define a fluid flow path, wherein fluid within the fluid flow path absorbs heat from the thermally conductive mass.

22. The heater apparatus of claim 21 further comprising:
control means, connected to the heating means, for activating the heating means.

23. The heater apparatus of claim 21 wherein:
the heating means is disposed in the thermally conductive mass and substantially encompassed by the fluid flow path.

24. The heater apparatus of claim 21 further comprising:
a housing carrying the thermally conductive mass in an interior cavity.

25. The heater apparatus of claim 24 further comprises:
a closure fixed to the mass for closing the fluid flow channels in the mass; and
seal means, mounted over a portion of the fluid flow path in the thermally conductive mass to fluidically seal the thermally conductive mass to the housing.

26. The heater apparatus of claim 24 wherein the fluid flow path comprises:
a first flow path portion extending across one surface of the thermally conductive mass; and
a second flow path portion extending across an opposed surface of the thermally conductive mass, the first and second flow path portions disposed in fluid flow communication.

27. The heater apparatus of claim 26 wherein the first and second flow path portions are disposed in fluid flow communication substantially at the center of the thermally conductive mass.

28. The heater apparatus of claim 24 wherein the heating means comprises:
a plurality of heater elements mounted in the mass.

29. The heater apparatus of claim 25 wherein the seal means comprises:
an O-ring disposed between the peripheral portions of the closure and the thermally conductive mass.

30. The heater apparatus of claim 21 wherein:
the fluid flow path is defined by a plurality of throughbores extending through first and second ends;
the heater means mounted in the thermally conductive mass concentrically within and surrounding by the plurality of throughbores; and
means for coupling a fluid inlet to one end of each of a plurality of throughbores and a fluid outlet to each of the other ends of the plurality of throughbores to define the fluid flow path as at least one parallel flow path between the inlet and the outlet through the plurality of throughbores.

31. The heater apparatus of claim 30 wherein the plurality of throughbores each has a helical path between opposed first and second ends.

32. The heater apparatus of claim 30 wherein the thermally conductive mass further comprises a plurality of lamina, each lamina having a first aperture defining portion of the throughbores and a second aperture defining a portion of a path for receiving the heater means.

33. The heater apparatus of claim 30 wherein the throughbores define parallel flow paths through the thermally conductive mass.

34. A method for manufacturing a fluid heater comprising the steps of:
providing a thermally conductive mass with a low porosity, the mass having at least one fluid flow channel extending therethrough, the fluid flow channel having first and second ends;
mounting heater means in the thermally conductive mass, the heater means supplying heat, when activated, to the thermally conductive mass; and
fluidically coupling a fluid inlet to one end of the fluid flow channel and a fluid outlet to the other end of the fluid flow channel to define a fluid flow path between the inlet and the outlet wherein fluid in the fluid flow path absorbs heat from the thermally conductive mass.

35. The method of claim 34 wherein the step of providing the thermally conductive mass further comprises the step of:
forming the thermally conductive mass of one of aluminum, ceramic and poltruded carbon.

36. The method of claim 34 wherein the step of providing the thermally conductive mass further comprises the step of:
forming the thermally conductive mass by one of molding and casting.

37. The method of claim 34 wherein the step of providing the thermally conductive mass further comprises the step of:
forming the thermally conductive mass of a material cast at a semi-solid material temperature.

38. The method of claim 34 wherein the step of providing the thermally conductive mass further comprises the step of:
extruding the thermally conductive mass from a low porosity material.

39. The method of claim 38 wherein the step of providing the thermally conductive mass further comprises the step of:
forming the thermally conductive mass of one of aluminum, ceramic and poltruded carbon.

40. The method of claim 39 wherein the step of providing the thermally conductive mass further comprises the step of:
extruding the thermally conductive mass as a one piece, monolithic body.

41. The method of claim 40 further comprising the step of:
forming the fluid flow channel as at least one throughbore extending between first and second ends in the body.

42. The method of claim 41 further comprising the step of:
forming the at least one throughbore in a helical path between the first and second ends.

43. The method of claim 39 wherein the step of providing the thermally conductive mass further comprises the step of:

forming the thermally conductive mass of a plurality of lamina, each lamina carrying an aperture defining a portion of the throughbore; and another aperture defining a portion of a bore for receiving a heater means.

44. The method of claim 40 further comprising the steps of:

providing the thermally conductive mass having a plurality of throughbores extending through first and second ends;

mounting the heater means in the thermally conducive mass concentrically within and surrounded by the plurality of throughbores, the heater means supplying heat, when activated, to the thermally conductive mass; and fluidically coupling one fluid inlet to one end of each of the plurality of throughbores and one fluid outlet to each of the other ends of the throughbores to define at least one parallel flow path between the inlets and the outlets through the plurality of throughbores wherein fluid in the through bores absorbs heat from the thermally conductive mass.

45. The method of claim 44 further comprising the step of:

forming each of the throughbores in a helical path between opposed ends.

46. The method of claim 38 further comprising the step of:

forming the thermally conductive mass of a plurality of lamina, each lamina canying an aperture defining a portion of the throughbores, and another aperture defining a portion of a bore for receiving the heater means.

* * * * *

UNITED STATES PATENT AND TRADEMARK OFFICE
CERTIFICATE OF CORRECTION

PATENT NO.       : 7,190,893 B2
APPLICATION NO.  : 10/608508
DATED            : March 13, 2007
INVENTOR(S)      : Karl-Heinz Kuebler et al.

It is certified that error appears in the above-identified patent and that said Letters Patent is hereby corrected as shown below:

Title Page; item (56);
Page 2, Right Column (not numbered), Line 1; Class and subclass of patent 6,236,019; replace "219/303" with --219/203--.
Column 5, Line 58; Replace "161W/m° C" with --161 W/m° C--.
Column 18, Line 42, (Claim 19); Replace "0-ring" with --O-ring--.
Column 20, Line 37-38, (Claim 35); Replace "alum mum" with --aluminum--.
Column 22, Line 12, (Claim 46); Replace "canying" with --carrying--.
Column 3, Line 59; Add --;-- after "17".
Column 4, Line 58; Replace "activated by a" with --activated by an--.
Column 5, Line 8; Replace "heater module 110" with --heater module 10--.
Column 5, Lines 9, 10, 17, 21, 29, 35, 63, 67; Replace each occurrence of "140" with --40--.
Column 6, Lines 6 (twice), 8, 10; Replace each occurrence of "140" with --40--.
Column 5, Line 36; Replace "increase" with --increased--.
Column 5, Line 43; Replace "gobular" with --globular--.
Column 6, Line 65; Replace "79 81" with --79 and 81--.
Column 8, Line 23; Replace "heater module 40" with --heater module 10--.
Column 9, Line 58; Replace "first plate 140" with --first plate 73--.
Column 9, Line 59; Replace "first plate 23" with --first plate 73--.
Column 10, Line 13; Replace "fluids" with --fluids,-- and replace "water" with --water,--.
Column 10, Line 49; Replace "cavity 162" with --cavity 186--.
Column 10, Line 50; Replace "71 and 73" with --73 and 74--.
Column 11, Lines 48, 50; Replace each occurrence of "310" with --320--.
Column 12, Lines 5, 7, 11, 22, 24, 25; Replace each occurrence of "310" with --320--.
Column 12, Line 26; Replace "sleeve 342" with --sleeve 342 (FIG. 18) or 344 (FIG. 17)--.
Column 12, Line 54; Delete reference number "371".
Column 12, Lines 56, 62; Delete each occurrence of reference number "374".
Column 12, Line 64; Replace word "element" with --elements--.
Column 13, Lines 2, 5, 36; Delete each occurrence of reference number "374".
Column 13, Lines 9, 12, 16, 17; Replace each occurrence of reference number "380" with --80 (FIG. 21)--.
Column 13, Line 11; Replace reference number "382" with --82 (FIG. 21)--.
Column 13, Line 20; Replace reference number "64" with --364--.
Column 14, Line 11; Replace reference number "140" with --40--.
Column 14, Line 12; Replace "casing" with --casting--.
Column 14, Lines 35, 45, 46; Delete each occurrence of reference number "374".
Column 14, Line 47; Replace "350 ," with --350,--.
Column 15, Lines 33, 55; Replace each occurrence of reference number "310" with --320--.

UNITED STATES PATENT AND TRADEMARK OFFICE
CERTIFICATE OF CORRECTION

PATENT NO.        : 7,190,893 B2
APPLICATION NO.   : 10/608508
DATED             : March 13, 2007
INVENTOR(S)       : Karl-Heinz Kuebler et al.

It is certified that error appears in the above-identified patent and that said Letters Patent is hereby corrected as shown below:

Column 15, Line 44; Replace "step wise" with --stepwise--.
Column 15, Line 57; Column 16, Line 11; Replace each occurrence of reference number "322" with --22--.
Column 15, Line 58; Column 16, Line 17; Replace each occurrence of reference number "314" with --14--.
Column 15, Line 59; Replace reference number "326" with --30--.
Column 16, Line 8; Replace reference number "374" with --372--.
Column 16, Line 10; Replace reference number "324" with --24--.
Column 16, Line 12; Replace reference number "310" with --320--.
Column 16, Line 34; Replace "Alternate the step" with --Alternate step--.
Column 21, Line 11 (Claim 44); Replace word "conducive" with --conductive--.
Column 22, Line 4; Replace "through bores" with --throughbores--.

Signed and Sealed this

Third Day of July, 2007

JON W. DUDAS
*Director of the United States Patent and Trademark Office*